US011938739B2

(12) United States Patent
Mizutani et al.

(10) Patent No.: US 11,938,739 B2
(45) **Date of Patent: *Mar. 26, 2024**

(54) INK REFILL CONTAINER, INK REFILL SYSTEM, AND INK REFILL ADAPTER

(71) Applicant: SEIKO EPSON CORPORATION, Tokyo (JP)

(72) Inventors: Tadahiro Mizutani, Shiojiri (JP); Ryoichi Tanaka, Shiojiri (JP); Manabu Akahane, Tatsuno-machi (JP); Makoto Kobayashi, Shiojiri (JP); Naomi Kimura, Okaya (JP); Hideki Okumura, Shiojiri (JP); Shoma Kudo, Shiojiri (JP); Tetsuya Takamoto, Matsumoto (JP); Hiroaki Sakai, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,895

(22) Filed: Mar. 15, 2023

(65) Prior Publication Data

US 2023/0219349 A1 Jul. 13, 2023

Related U.S. Application Data

(63) Continuation of application No. 17/504,984, filed on Oct. 19, 2021, now Pat. No. 11,639,060, which is a (Continued)

(30) Foreign Application Priority Data

Jun. 10, 2016 (JP) ................................ 2016-116155
Oct. 17, 2016 (JP) ................................ 2016-203332
Oct. 25, 2016 (JP) ................................ 2016-208864

(51) Int. Cl.
*B41J 2/175* (2006.01)

(52) U.S. Cl.
CPC ....... *B41J 2/17553* (2013.01); *B41J 2/17503* (2013.01); *B41J 2/17509* (2013.01);
(Continued)

(58) Field of Classification Search
CPC .. B41J 2/17536; B41J 2/17513; B41J 2/1752; B41J 2/17523; B41J 2/17509;
(Continued)

(56) References Cited

U.S. PATENT DOCUMENTS

D236,694 S 9/1975 Avolio
D240,201 S 6/1976 Avoilio et al.
(Continued)

FOREIGN PATENT DOCUMENTS

CN 1269749 A 10/2000
CN 1313233 A 9/2001
(Continued)

OTHER PUBLICATIONS

Jul. 15, 2020 Notice of Allowance issued in U.S. Appl. No. 16/857,065.
(Continued)

*Primary Examiner* — An H Do
(74) *Attorney, Agent, or Firm* — Oliff PLC

(57) ABSTRACT

An ink refill container includes a container main body including an ink storage chamber, an ink outlet-forming portion provided on an end portion of the container main body forming an ink outlet that allows the ink to flow out from the ink storage chamber, and a valve provided in the ink outlet-forming portion configured to openably seal the ink outlet, in which the ink outlet-forming portion includes a positioning portion on an outer side of the ink outlet-forming portion. in which the positioning portion is closer to (Continued)

the container main body than the valve is to the container main body in a central axis direction of the ink outlet, and in which the positioning portion partially abuts against an ink tank when the valve is opened for refilling the ink to the ink tank, to thereby position the valve relative to the ink tank.

16 Claims, 39 Drawing Sheets

Related U.S. Application Data continuation of application No. 17/070,064, filed on Oct. 14, 2020, now Pat. No. 11,179,944, which is a continuation of application No. 16/857,065, filed on Apr. 23, 2020, now Pat. No. 10,889,123, which is a continuation of application No. 16/307,625, filed as application No. PCT/JP2017/021057 on Jun. 7, 2017, now Pat. No. 10,717,287.

(52) U.S. Cl.
CPC ......... *B41J 2/17513* (2013.01); *B41J 2/1752* (2013.01); *B41J 2/17523* (2013.01); *B41J 2/1753* (2013.01); *B41J 2/17533* (2013.01); *B41J 2/17536* (2013.01); *B41J 2/1754* (2013.01); *B41J 2/17596* (2013.01)

(58) Field of Classification Search
CPC .. B41J 2/1754; B41J 2/17503; B41J 2/17553; B41J 2/17596; B41J 2002/17573; B41J 29/13; B41J 29/02
See application file for complete search history.

(56) References Cited

U.S. PATENT DOCUMENTS

| | | | |
|---|---|---|---|
| 4,524,365 | A | 6/1985 | Kakeno et al. |
| D398,634 | S | 9/1998 | Katayama et al. |
| 5,874,976 | A | 2/1999 | Katon et al. |
| 5,920,333 | A | 7/1999 | Bates |
| D424,442 | S | 5/2000 | Kreiseder |
| 6,076,920 | A | 6/2000 | Zapata et al. |
| 6,079,823 | A | 6/2000 | Droege |
| 6,164,768 | A | 12/2000 | Murphy et al. |
| D469,119 | S | 1/2003 | Shiba |
| 6,520,630 | B1 | 2/2003 | Oda et al. |
| 6,770,672 | B1 | 8/2004 | Sanders et al. |
| D513,180 | S | 12/2005 | Lindsey et al. |
| 7,014,055 | B2 | 3/2006 | Kano et al. |
| D524,366 | S | 7/2006 | Arai et al. |
| D529,542 | S | 10/2006 | Tazawa |
| D538,850 | S | 3/2007 | Choi et al. |
| 7,300,138 | B2 | 11/2007 | Corner et al. |
| 7,360,876 | B2 | 4/2008 | Inoue et al. |
| D583,862 | S | 12/2008 | Park et al. |
| 7,458,665 | B2 | 12/2008 | Batista et al. |
| 7,607,770 | B2 | 10/2009 | Inoue et al. |
| 7,887,166 | B2 | 2/2011 | Guhse et al. |
| 7,980,686 | B2 | 7/2011 | Guhse et al. |
| 8,020,719 | B2 | 9/2011 | Maiwald et al. |
| 9,090,075 | B2 | 7/2015 | Matsumoto et al. |
| 9,186,902 | B2 | 11/2015 | Ishizawa et al. |
| 9,199,769 | B2 | 12/2015 | Wood et al. |
| 9,592,675 | B2 | 3/2017 | Matsumoto et al. |
| 9,662,893 | B2 | 5/2017 | Mori et al. |
| 9,718,276 | B2 | 8/2017 | Tomoguchi |
| 9,994,037 | B2 | 6/2018 | Sakai |
| 10,105,960 | B2 | 10/2018 | Tomoguchi |
| 10,286,676 | B2 | 5/2019 | Kimura et al. |
| 10,350,896 | B2 | 7/2019 | Ishizawa et al. |
| 10,350,901 | B2 | 7/2019 | Mizutani et al. |
| 10,369,800 | B2 | 8/2019 | Rooney et al. |
| 10,427,412 | B2 | 10/2019 | Okude et al. |
| D865,521 | S | 11/2019 | Ishizawa et al. |
| 10,471,723 | B2 | 11/2019 | Fukasawa et al. |
| D899,513 | S | 10/2020 | Ohashi et al. |
| 10,889,123 | B2 * | 1/2021 | Mizutani .............. B41J 2/17509 |
| 11,192,380 | B2 | 12/2021 | Ishizawa et al. |
| 11,298,952 | B2 | 4/2022 | Mizutani et al. |
| 2001/0027957 | A1 | 10/2001 | Kano |
| 2004/0060893 | A1 | 4/2004 | Kano et al. |
| 2004/0061748 | A1 | 4/2004 | Kuwabara et al. |
| 2005/0011916 | A1 | 1/2005 | Battista et al. |
| 2005/0151809 | A1 | 7/2005 | Corner et al. |
| 2005/0270342 | A1 | 12/2005 | Ogura et al. |
| 2006/0017787 | A1 | 1/2006 | Inoue et al. |
| 2006/0108378 | A1 | 5/2006 | Cohen et al. |
| 2007/0024683 | A1 | 2/2007 | Yan |
| 2007/0171263 | A1 | 7/2007 | Inoue et al. |
| 2009/0096836 | A1 | 4/2009 | Haines et al. |
| 2009/0101644 | A1 | 4/2009 | Maiwald et al. |
| 2010/0201761 | A1 | 8/2010 | Lu et al. |
| 2011/0155687 | A1 | 6/2011 | Ammann |
| 2012/0043293 | A1 | 2/2012 | Bryan et al. |
| 2012/0125481 | A1 | 5/2012 | Matsumoto et al. |
| 2012/0152978 | A1 | 6/2012 | Sekiyama et al. |
| 2013/0258004 | A1 | 10/2013 | Kyotani |
| 2014/0104349 | A1 | 4/2014 | Kimura et al. |
| 2014/0158660 | A1 | 6/2014 | Wood et al. |
| 2015/0077487 | A1 | 3/2015 | Ishizawa et al. |
| 2015/0124028 | A1 | 5/2015 | Kimura et al. |
| 2015/0283816 | A1 | 10/2015 | Kimura et al. |
| 2016/0016408 | A1 | 1/2016 | Matsumoto et al. |
| 2016/0089893 | A1 | 3/2016 | Osakabe et al. |
| 2016/0121619 | A1 | 5/2016 | Tomoguchi |
| 2016/0200110 | A1 | 7/2016 | Matsushita et al. |
| 2016/0200111 | A1 | 7/2016 | Kimura et al. |
| 2016/0303860 | A1 | 10/2016 | Mori et al. |
| 2016/0303863 | A1 | 10/2016 | Sakai |
| 2016/0332455 | A1 | 11/2016 | Yoshida et al. |
| 2017/0008295 | A1 | 1/2017 | Osakabe et al. |
| 2017/0120606 | A1 | 5/2017 | Koshikawa et al. |
| 2017/0266977 | A1 | 9/2017 | Osakabe et al. |
| 2017/0282570 | A1 | 10/2017 | Yamaguchi |
| 2017/0313089 | A1 | 11/2017 | Matsushita et al. |
| 2017/0326882 | A1 | 11/2017 | Okude et al. |
| 2017/0341402 | A1 | 11/2017 | Nagashima et al. |
| 2017/0355191 | A1 | 12/2017 | Mizutani et al. |
| 2017/0355194 | A1 | 12/2017 | Fukasawa et al. |
| 2017/0355195 | A1 | 12/2017 | Fukasawa et al. |
| 2017/0368833 | A1 | 12/2017 | Tomoguchi |
| 2018/0154645 | A1 | 6/2018 | Rooney et al. |
| 2018/0207939 | A1 | 7/2018 | Ishizawa et al. |
| 2018/0250943 | A1 | 9/2018 | Fukasawa et al. |
| 2018/0290456 | A1 | 10/2018 | Osakabe et al. |
| 2019/0275801 | A1 | 9/2019 | Osakabe et al. |
| 2019/0299624 | A1 | 10/2019 | Mizutani et al. |
| 2020/0207108 | A1 | 7/2020 | Osakabe et al. |
| 2022/0024214 | A1 | 1/2022 | Osakabe et al. |

FOREIGN PATENT DOCUMENTS

| | | | |
|---|---|---|---|
| CN | 101412450 | A | 4/2009 |
| CN | 101444997 | A | 6/2009 |
| CN | 102126351 | A | 7/2011 |
| CN | 101804736 | B | 12/2011 |
| CN | 202138070 | U | 2/2012 |
| CN | 202186122 | U | 4/2012 |
| CN | 202702869 | U | 1/2013 |
| CN | 204382821 | U | 6/2015 |
| CN | 105564038 | A | 5/2016 |
| CN | 207291315 | U | 5/2018 |
| EP | 0 707 970 | A2 | 4/1996 |
| EP | 3 075 540 | A1 | 10/2016 |
| GB | 2 080 775 | A | 2/1982 |
| IN | 300515-0001 | | 3/2018 |
| JP | S58-107348 | A | 6/1983 |
| JP | S59-042963 | A | 3/1984 |
| JP | H05-35690 | U | 5/1993 |
| JP | 3021835 | U | 3/1996 |

(56) References Cited

FOREIGN PATENT DOCUMENTS

| | | | |
|---|---|---|---|
| JP | H09-020018 | A | 1/1997 |
| JP | H09-294955 | A | 11/1997 |
| JP | H10-216612 | A | 8/1998 |
| JP | H11-123834 | A | 5/1999 |
| JP | 2001-002097 | A | 1/2001 |
| JP | 2001-088317 | A | 4/2001 |
| JP | 2001-146021 | A | 5/2001 |
| JP | 2001-187459 | A | 7/2001 |
| JP | 2003-305865 | A | 10/2003 |
| JP | 2004-142442 | A | 5/2004 |
| JP | 2004-142447 | A | 5/2004 |
| JP | 2005-028859 | A | 2/2005 |
| JP | 2006-263960 | A | 10/2006 |
| JP | 2006-281793 | A | 10/2006 |
| JP | 2008-162595 | A | 7/2008 |
| JP | 2008-200912 | A | 9/2008 |
| JP | 2009-241608 | A | 10/2009 |
| JP | 2010-076428 | A | 4/2010 |
| JP | 2010-240907 | A | 10/2010 |
| JP | 3168889 | U | 6/2011 |
| JP | 2011-230840 | A | 11/2011 |
| JP | D14-29123 | | 12/2011 |
| JP | 2012-106363 | A | 6/2012 |
| JP | 2012-131068 | A | 7/2012 |
| JP | 2012-176587 | A | 9/2012 |
| JP | D1455311 | S | 11/2012 |
| JP | 2013-176968 | A | 9/2013 |
| JP | 2013-226830 | A | 11/2013 |
| JP | 2014-008640 | A | 1/2014 |
| JP | 2014-079909 | A | 5/2014 |
| JP | 2014-088207 | A | 5/2014 |
| JP | 2014-091257 | A | 5/2014 |
| JP | 2015-058543 | A | 3/2015 |
| JP | 2015-178280 | A | 10/2015 |
| JP | 2016-041595 | A | 3/2016 |
| JP | 2016-68473 | A | 5/2016 |
| JP | 2016-087844 | A | 5/2016 |
| JP | 2016-102824 | A | 6/2016 |
| JP | 2016-190402 | A | 11/2016 |
| JP | 2016-203404 | A | 12/2016 |
| JP | 2016-203991 | A | 12/2016 |
| JP | 2017-039517 | A | 2/2017 |
| JP | 2017-205895 | A | 11/2017 |
| WO | 2004028817 | A1 | 4/2004 |
| WO | 2014/084264 | A1 | 6/2014 |
| WO | 2015/079547 | A1 | 6/2015 |
| WO | 2016/060019 | A1 | 4/2016 |
| WO | 2017/020915 | A1 | 2/2017 |
| WO | 2020/242453 | A1 | 12/2020 |

OTHER PUBLICATIONS

International Search Report dated Aug. 22, 2017 in PCT/JP2017/021057 with English-language translation (4 pgs.).

Final Office Action dated Oct. 19, 2018 in related U.S. Appl. No. 15/617,682.

Final Office Action dated Sep. 4, 2018 in co-pending U.S. Appl. No. 15/615,525 (11 pgs.).

International Search Report dated Aug. 22, 2017 in PCT/JP2017/021276 with English-language translation (4 pgs.).

Office Action dated May 31, 2018 in co-pending U.S. Appl. No. 15/617,682 (8 pgs.).

Office Action dated May 31, 2018 in co-pending U.S. Appl. No. 15/617,782 (8 pgs.).

Office Action dated Feb. 13, 2018 in co-pending U.S. Appl. No. 15/615,525 (10 pgs.).

Final Office Action on U.S. Appl. No. 15/617,834 dated Mar. 26, 2019.

Ink Pro 2 day. Link <https://www.inkpro2day.com/4-empty-90mi-ink-bottles-with- special-filling-cap-for-epson-ecotank-printers/?gclid=EAlalQobChM l16zqt5z>.

Dec. 16, 2022 Notice of Allowance Issued in U.S. Appl. No. 17/504,984.

* cited by examiner

INK REFILL CONTAINER, INK REFILL SYSTEM, AND INK REFILL ADAPTER

CROSS-REFERENCE TO RELATED APPLICATIONS

This application is a continuation of U.S. application Ser. No. 17/504,984, filed Oct. 19, 2021; which is a continuation of U.S. application Ser. No. 17/070,064, filed Oct. 14, 2020; which is a continuation of U.S. application Ser. No. 16/857,065, filed Apr. 23, 2020; which is a continuation of U.S. application Ser. No. 16/307,625, filed Dec. 6, 2018; which is the national phase entry of PCT/JP2017/021057, filed Jun. 7, 2017; which claims priority to Japanese Application No. 2016-116155, filed Jun. 10, 2016; Japanese Application No. 2016-203332, filed Oct. 17, 2016; and Japanese Application No. 2016-208864, filed Oct. 25, 2016; the contents of all of which are incorporated by reference herein in their entirety.

FIELD

The present invention relates to an ink refill container that can appropriately refill ink to an ink tank that stores ink to be refilled to a recording device, an ink refill system that contains the ink refill container, and an ink refill adapter that uses the ink refill system.

BACKGROUND

In a recording device, previously, that performs recording by ejecting ink onto a medium, an ink tank that stores ink is connected to the recording device in a manner that allows the ink tank to refill the ink. In addition, when only a small amount of ink remains in the ink tank in the recording device, an ink refill container is used to externally refill the ink to the ink tank (see, for example, Patent Literature 1).

CITATION LIST

Patent Literature

[Patent Literature 1] JP 2001-146021A

SUMMARY

Technical Problem

This operation of refilling the ink tank with the ink needs to be carried out appropriately to prevent incorrect refilling or other problems. However, this refilling operation has generally been carried out by a user of the recording device. Therefore, there is a need to further improve, for example, the ink refill container to allow the user to correctly perform the ink refill operation.

The present invention has been made in view of the above-mentioned circumstances, and it is an object of the present invention to provide an ink refill container that can appropriately refill ink to an ink tank, an ink refill system that contains the ink refill container, and an ink refill adapter that uses the ink refill system.

Solution to Problem

Means and the effects thereof for solving the above-mentioned problem are described below.

An ink refill container for solving the above-mentioned problem is an ink refill container configured to refill ink to an ink tank configured to store ink, the ink refill container including a container main body including an ink storage chamber configured to store ink to be refilled to the ink tank, an ink outlet-forming portion that is provided on an end portion of the container main body, in which an ink outlet that allows ink to flow out from the ink storage chamber is formed, and a valve provided in the ink outlet-forming portion, configured to seal the ink outlet in an openable/closeable manner, in which the ink outlet-forming portion includes a positioning portion at a position on an outer side of the ink outlet-forming portion, the positioning portion being closer to the container main body than the valve is to the container main body in a central axis direction of the ink outlet, and in which the positioning portion abuts against a part of the ink tank when the valve is opened and positioned with respect to the ink tank.

With this configuration, because the valve opens while being positioned with respect to the ink tank when the ink is refilled from the ink refill container to the ink tank, problems such as ink spillage and incorrect ink refilling, which may occur when the valve displaces as the valve opens, can be suppressed, and the ink can be correctly refilled to the ink tank.

In addition, in the above-mentioned ink refill container, the valve is preferably provided with at least one or more slits in an elastic member configured to seal the ink outlet, and opens when the slit is pushed inward from outside the ink outlet.

With this configuration, an ink refill container with a simple structure and few components can be provided.

In addition, in the ink refill container, the positioning portion is preferably positioned radially outward of the ink outlet in a radial direction of the ink outlet when viewed from the central axis direction of the ink outlet.

With this configuration, when the ink is refilled from the ink refill container to the ink tank, because the positioning portion in the ink refill container abuts against the part of the ink tank while being positioned on an outer side of the ink outlet in the radial direction, the ink can be refilled in a stable manner.

In addition, in the ink refill container, the positioning portion is preferably formed as a member separate to the ink outlet-forming portion.

With this configuration, the positioning portion can be optimized in accordance with the design specifications of the ink tank and the ink refill container.

An ink refill system for solving the above-mentioned problem includes an ink storage chamber that configured to store ink, a needle that extends and includes a flow passage for communicating the inside and the outside of the ink storage chamber, and a receiving surface that extends in a direction that intersects a direction in which the needle extends at a position further outside than a tip of the needle, in which the receiving surface forms the part of the ink tank; and the ink refill container configured as described above, and in which, the positioning portion in the ink refill container abuts against the receiving surface when the tip of the needle is inserted into the ink outlet to open the valve.

With this configuration, when the needle of the ink tank is inserted into the ink outlet of the ink refill container to open the valve, the positioning portion of the ink refill container abuts against the receiving surface of the ink tank, and determines the relative positional relationship between the valve and the needle. Therefore, the valve can be appropriately opened by the needle, and the occurrence of incorrect ink refilling can be suppressed.

In addition, in the ink refill system, the ink tank preferably includes a concave portion that opens in the direction in which the needle extends in an area that forms the outer side of the needle in a radial direction centered about the needle, and the ink refill container preferably includes a convex portion configured to fit into the concave portion when the tip of the needle is inserted into the ink outlet in a region that forms the outer side of the ink outlet in a radial direction centered about the ink outlet.

With this configuration, the needle is not inserted into the ink outlet unless the convex portion of the ink refill container is fit into the concave portion of the ink tank, and hence a state in which the ink tank and the ink refill container are incorrectly connected can be suppressed.

In addition, in the ink refill system, the ink refill container preferably includes the positioning portion at a position on an outer side of the ink outlet-forming portion, the positioning portion being closer to the container main body than the convex portion is to the container main body in the central axis direction of the ink outlet.

With this configuration, a state in which the ink tank and the ink refill container are incorrectly connected can be suppressed. Further, appropriate positioning of the insertion of the needle into the ink outlet of the ink refill container can be ensured.

In addition, in the ink refill system, the tip of the needle of the ink tank is preferably located closer to the ink storage chamber than the receiving surface is located to the ink storage chamber.

With this configuration, the tip of the needle of the ink tank does not protrude out further than the receiving surface. Therefore, even if ink adheres to the tip of the needle, a risk of the ink adhering to the ink refill container or the hand of a user performing the ink refill operation can be reduced.

In addition, in the ink refill system, the flow passage of the needle of the ink tank is preferably formed of two flow passages with tip openings arranged in parallel in a radial direction about the center of the needle, and, when one of the two flow passages functions as an ink flow passage to allow the flow of ink, the other flow passage preferably functions as an air flow passage to allow the flow of air.

With this configuration, when the ink refill container is connected to the ink tank while being inclined along a radial direction in which the two flow passages are arranged from the direction in which the needle extends, one flow passage among the two flow passages located on a side on which the ink outlet of the ink refill container approaches first functions as the ink flow passage, and the other flow passage functions as the air flow passage. Therefore, because the user can use either one of the two flow passages as the ink flow passage, the user can perform the ink refill operation quickly without needing to choose the flow passage to be the ink flow passage.

Further, another ink refill system for solving the above-mentioned problem includes an ink tank including an ink storage chamber configured to store ink, an ink inlet that allows ink to flow into the ink storage chamber, and a concave portion formed in a region that forms an outer side of the ink inlet in a radial direction centered about the ink inlet; and an ink refill container including an ink storage chamber configured to store ink to be refilled to the ink tank, an ink outlet that allows the ink to flow out from the ink storage chamber, and a convex portion formed so as to fit into the concave portion in a region that forms an outer side of the ink outlet in a radial direction centered about the ink outlet, in which the ink tank includes a first concave/convex portion located at a position inside of the concave portion, the first concave/convex portion being closer to the bottom of the concave portion than the opening edge of the concave portion is to the bottom of the concave portion, and the ink refill container includes a second concave/convex portion in the convex portion, the second concave/convex portion being configured to engage with the first concave/convex portion of the ink tank.

With this configuration, by fitting the convex portion of the ink refill container into the concave portion of the ink tank, and engaging the second concave/convex portion on the outer surface of the convex portion with the first concave/convex portion on the inner surface of the concave portion, the user can recognize that an ink refill container appropriate for the ink tank has been connected. Therefore, because a state in which the ink tank and the ink refill container are incorrectly connected can be suppressed, and the first concave/convex portion is located at a position inside of the concave portion, the first concave/convex portion being closer to the bottom of the concave portion than the opening edge of the concave portion is to the bottom of the concave portion, the convex portion of the ink refill container can be easily guided to the bottom side from the opening side of the concave portion of the ink tank, and insertion thereof can be performed easily.

In addition, in the ink tank of the ink refill system, a depth direction of the concave portion preferably corresponds to a central axis direction of the ink inlet, the first concave/convex portion is preferably provided so as to extend along the depth direction of the concave portion on the inner surface of the concave portion, and in the ink refill container, the ink outlet is preferably connected to the ink inlet when the convex portion is fitted into the concave portion and the second concave/convex portion is engaged with the first concave/convex portion.

With this configuration, the second concave/convex portion on the outer surface of the convex portion of the ink refill container can be engaged with the first concave/convex portion provided so as to extend along the depth direction of the concave portion on the inner surface of the concave portion of the ink tank by the convex portion being fitted into the concave. As a result, it is easy to recognize the connection direction of the ink outlet of the ink refill container to the ink inlet of the ink tank.

In addition, in the ink refill system, the depth direction of the concave portion in the ink tank is preferably a direction that intersects with a horizontal direction and faces downward when the ink outlet is connected to the ink inlet.

With this configuration, under a state in which the ink outlet of the ink refill container is connected to the ink inlet of the ink tank, the ink can be prevented from returning to the ink storage chamber from the ink outlet of the ink refill container, and the ink can be appropriately refilled to the ink tank from the ink refill container.

Yet another ink refill system for solving the above-mentioned problem includes an ink tank including an ink storage chamber configured to store ink, an ink inlet that allows the ink to flow into the ink storage chamber, a plurality of first fitting portions that are formed in a region that forms an outer side of the ink inlet in a radial direction centered about the ink inlet so as to be point symmetrical about the ink inlet; and an ink refill container including an ink storage chamber configured to store ink to be refilled to the ink tank, an ink outlet that allows the ink to flow out from the ink storage chamber, and a second fitting portion formed so as to be fittable into the first fitting portion, formed in a region that forms an outer side of the ink outlet in the radial direction centered about the ink outlet.

With this configuration, even when the second fitting portion in the ink refill container is fitted into any one of the plurality of fitting portions formed point symmetrically about the ink inlet in the ink tank, the ink outlet in the ink refill container can be connected to the ink inlet of the ink tank, and hence components can be easily connected to the ink tank of the ink refill container when the ink is refilled.

Further, a further ink refill system for solving the above-mentioned problem includes an ink tank that contains an ink storage chamber configured to store ink, an ink inlet that allows the ink to flow into the ink storage chamber, and a first fitting portion formed in a region that forms an outer side of the ink inlet in a radial direction centered about the ink inlet; and an ink refill container that contains an ink storage chamber configured to store ink to be refilled to the ink tank, an ink outlet that allows the ink to flow out from the ink storage chamber, and a second fitting portion formed so as to be fittable into the first fitting portion in a region that forms the outer side of the ink outlet in the radial direction centered about the ink outlet, in which the ink tank includes a first portion that shows information associated with the ink stored in the ink storage chamber, the ink refill container includes a second portion that shows information associated with the ink housed in the ink storage chamber, and the first portion and the second portion are provided at an externally visually recognizable position when the second fitting portion in the ink refill container is fit into the first fitting portion of the ink tank.

With this configuration, when the ink refill container is connected to the ink tank to refill the ink, the first portion and the second portion can be easily visually recognized to check whether or not the ink to be refilled is suitable.

Yet another ink refill system for solving the above-mentioned problem includes an ink tank that contains an ink storage chamber configured to store ink, an ink inlet that allows the ink to flow into the ink storage chamber, and a concave portion formed in a region that forms an outer side of the ink inlet in a radial direction centered about the ink inlet; and an ink refill container that contains an ink storage chamber configured to store ink to be refilled to the ink tank, an ink outlet that allows the ink to flow out from the ink storage chamber, and a convex portion formed so as to be fittable into the concave portion in a region that forms an outer side of the ink outlet in a radial direction centered about the ink outlet, in which the convex portion of the ink refill container protrudes further than the ink outlet in a direction opposing the ink storage chamber in a central axis direction of the ink outlet.

With this configuration, when the ink is refilled, because the convex portion protrudes further than the ink outlet in the ink refill container, a risk of the ink outlet touching the hand of the user or the vicinity around the ink tank can be reduced, and contamination due to the ink adhering to those places can be suppressed.

Conversely, the ink outlet can be made to protrude further than the convex portion in the direction opposing the ink storage chamber in the central axis direction. In this case, the ink outlet becomes easier to see when the ink is refilled.

In addition, in the above-mentioned ink refill system, the convex portion of the ink refill container preferably protrudes further outward than an outer peripheral surface of a container main body provided with the ink storage chamber in the radial direction centered about the ink outlet.

With this configuration, the user can easily visually recognize the convex portion when viewing the ink refill container, and the convex portion of the ink refill container can be easily fitted into the concave portion of the ink tank when the ink is refilled. As a result, incorrect connection of the ink refill container to the ink tank can be suppressed.

In addition, in the above-mentioned ink refill system, the convex portion of the ink refill container is preferably formed further inward than an outer peripheral surface of a container main body provided with the ink storage chamber in the radial direction centered about the ink outlet.

With this configuration, when the ink outlet of the ink refill container is connected to the ink inlet of the ink tank, the convex portion of the ink refill container is less likely to become a hindrance.

An ink refill adapter for solving the above-mentioned problem is an ink refill adapter in which an ink refill container and an ink tank are connected to each other when ink is refilled to the ink tank from the ink refill container, the ink refill adapter including a tank engaging portion configured to engage a plurality of ink tanks each containing an ink storage chamber configured to store ink as a group, a plurality of ink inlets each provided with the ink tank so as to allow the ink to flow into the ink storage chamber from the ink outlet of the ink refill container, and a plurality of identification units each provided to one of the plurality of ink inlets, with which it is possible to identify the ink refill container containing the ink outlet configured to connect to the ink inlet.

With this configuration, by giving the ink tanks a generic common structure, and engaging the tank engaging portions of the refill adapter by grouping the plurality of ink tanks, the ink refill adapter can be implemented with a structure that can suppress incorrect connection of the ink refill container when the ink is refilled.

Another ink refill adapter for solving the above-mentioned problem is an ink refill adapter mounted to an ink tank under a state in which ink is refilled to the ink tank from the ink refill container, the ink refill adapter including an inlet forming portion that at least partly surrounds an ink inlet flow passage configured to be inserted through the inlet forming portion, the ink inlet flow passage provided in an ink tank so as to allow ink to flow into an ink storage chamber provided in the ink tank, an adapter-side positioning portion configured to engage with a tank-side positioning portion provided in the ink tank, configured to position the ink refill adapter with respect to the ink tank, and an identification unit with which it is possible to identify the ink refill container containing the ink outlet configured to connect to the ink inlet.

With this configuration, because the ink refill adapter is positioned with respect to the ink tank, displacement between the ink inlet flow passage portion provided in the ink tank and the inlet forming portion provided in the ink refill adapter can be suppressed. Therefore, the ink can be appropriately refilled from ink refill container to the ink tank via the ink refill adapter.

In addition, in the ink refill adapter, the plurality of inlet forming portions, the identification unit corresponding to the plurality of inlet forming portions, and the plurality of adapter-side positioning portions are preferably formed integrally.

With this configuration, because the inlet forming portions, identification unit, and adapter-side positioning portions are formed integrally, the ink refill adapter can be manufactured more easily than if these components were provided separately.

DESCRIPTION OF EMBODIMENTS

First Embodiment

A first embodiment of a recording device is described with reference to the figures. The recording device according to this embodiment is an ink-jet printer configured to record (print) an image or the like on a medium by ejecting ink onto the medium.

Figure 1:
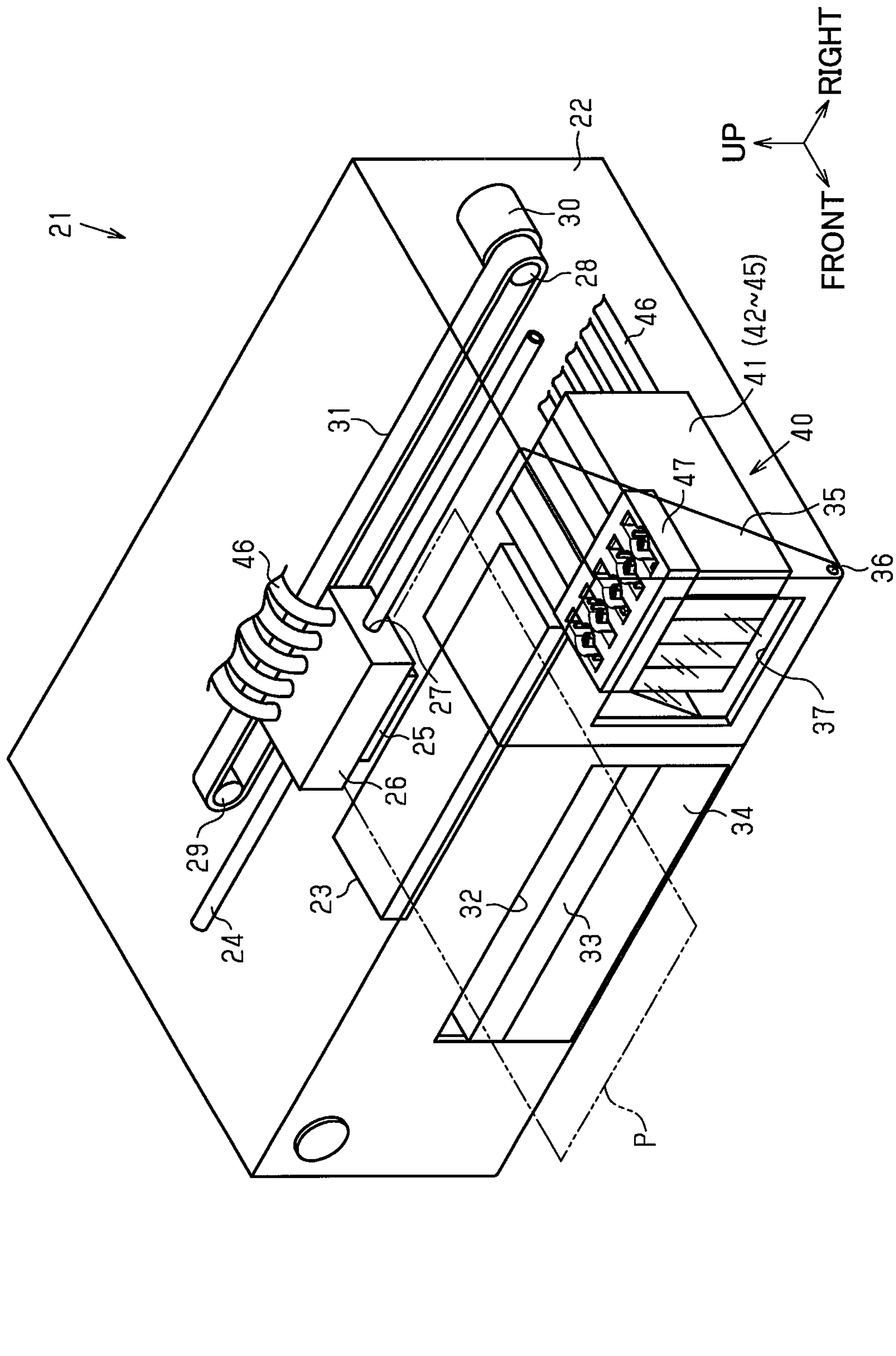
FIG. 1 is a perspective view for schematically illustrating a schematic configuration of a first embodiment of a recording device in a perspective state.

A recording device 21 illustrated in FIG. 1 includes a rectangular casing 22 in which a left-right direction corresponds to a longitudinal direction. FIG. 1 illustrates a simple perspective view of the inside of the casing 22 in the recording device 21. A support stand 23 in which a left-right direction corresponds to a longitudinal direction is provided on a lower portion of the casing 22 closer to the rear of the casing 22 so that an upper surface thereof extends along a substantially horizontal direction. A paper P as an example of a medium is fed toward the front, which is a feed direction, while being supported by the upper surface of the support stand 23. A guide shaft 24 that extends along the left-right direction is erected at an upper position of the support stand 23 in the casing 22, and a carriage 26 provided with a recording head 25 configured to eject ink on a lower surface side thereof is supported by the guide shaft 24. More specifically, the carriage 26 is supported by the guide shaft 24 so as to freely move back and forth in the left-right direction under a state in which the guide shaft 24 is inserted into a bearing hole 27 that is open in the left-right direction.

In the casing 22, a drive pulley 28 and a driven pulley 29 are each rotatably supported at positions near opposite ends of the guide shaft 24. An output shaft of a carriage motor 30 is linked to the drive pulley 28, and an endless timing belt 31 linked to a portion of the carriage 26 is wrapped around the drive pulley 28 and the driven pulley 29. When the carriage motor 30 is driven to reciprocally move the carriage 26 along the left-right direction as a scanning direction of the paper P while being guided by the guide shaft 24 via the timing belt 31, the paper P is fed to the front over the support stand 23, and ink is ejected onto the paper P from the recording head 25 on the lower surface side of the carriage 26.

At a position on a front side of the support stand 23 on a front surface side of the casing 22 illustrated in FIG. 1, the ink is ejected from the recording head 25 when the paper P is fed over the support stand 23 in the casing 22, to thereby open a rectangular discharge port 32 for discharging the paper P that has been recorded on to the front side. The discharge port 32 is provided with a rectangular plate-shape discharge tray 33 that can support the paper P discharged from the casing 22 so that the discharge tray 33 is freely retractable toward the front, which is a discharge direction.

In the discharge port 32, a paper refill cassette 34 that can store a plurality of the paper P to be used for recording on a lower side of the discharge tray 33 in a stacked state is mounted so as to be freely insertable in a front-back direction.

At a position on a front surface of the casing 22 illustrated in FIG. 1 and an end portion side further in the left-right direction than the discharge port 32 (a right end portion side in FIG. 1), an open/close door 35 that has a rectangular front surface and upper surface, and a right-angled triangle shaped right side surface is provided in a freely openable/closeable manner in the front-back direction centered about a rotation axis 36 provided on a lower end thereof and that extends in the left-right direction. A rectangular window portion 37 made of a transparent material is formed on a front surface of the open/close door 35. A user is able to visually recognize the inside of the casing 22 (in particular, a rear side of the front surface of the open/close door 35) when the open/close door 35 is closed.

In the casing 22 of the recording device 21, an ink refill unit 40 configured to refill ink to the recording head 25 is housed at a position on the rear side of the open/close door 35, that is, a position closer to the front surface and an end portion of the open/close door 35 (closer to a right end portion in this case). The ink refill unit 40 is a structure that includes a plurality of (in this embodiment, five) ink tanks 41 to 45 and can be regarded as integral. As described later, each ink tank 41 to 45 is configured to be able to refill the ink.

Figure 2:
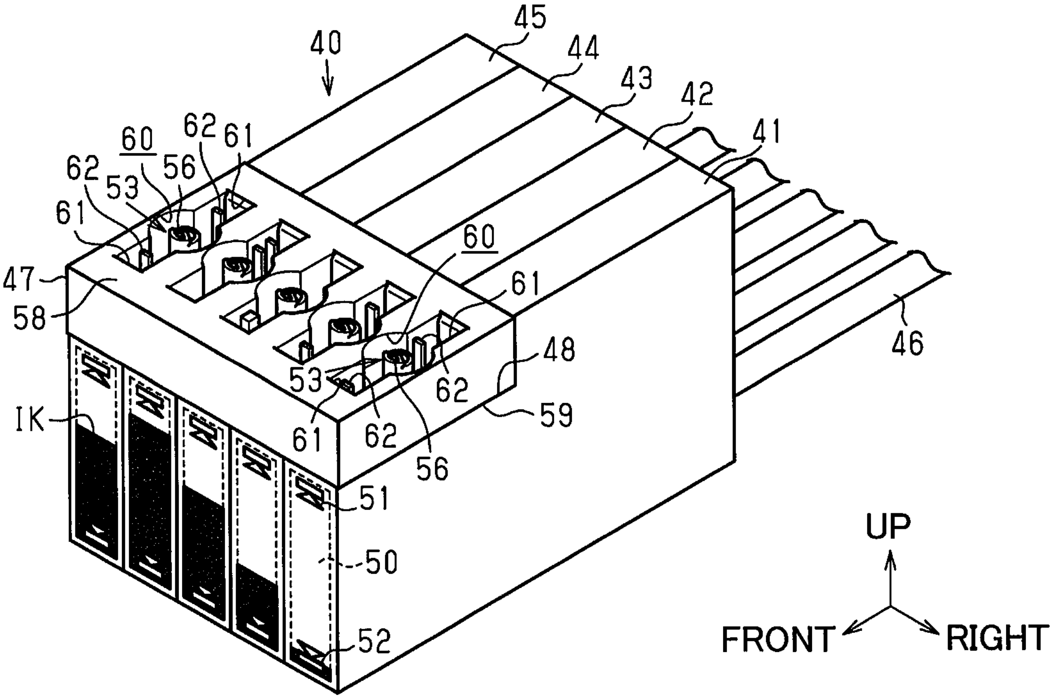
FIG. 2 is a perspective view for illustrating an ink refill unit that is provided in a casing of the recording device.
Figure 3:
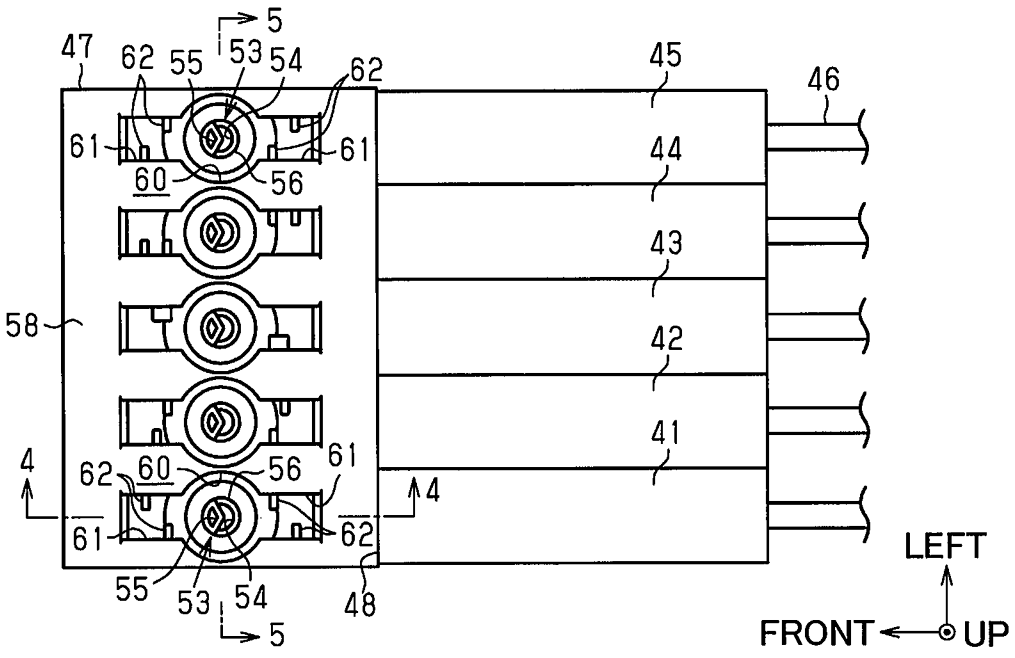
FIG. 3 is a plan view for illustrating the ink refill unit.

The ink refill unit 40 illustrated in FIG. 2 and FIG. 3 is formed of the five ink tanks 41 to 45 that are substantially box-shaped and long in the front-back direction, five ink refill tubes 46 each drawn out from the rear side of each ink tank 41 to 45, and a rectangular parallelepiped ink refill adapter 47 in which each of the ink tanks 41 to 45 are assembled as a group. Under a state in which all the ink tanks 41 to 45 are aligned side by side with a thickness direction as the left-right direction, the ink refill adapter 47 is assembled in a step portion 48 that is cut out in the upper front half portion of each of the ink tanks 41 to 45, to thereby by integral with the ink tanks 41 to 45. The ink refill tubes 46 drawn out from the ink tanks 41 to 45 illustrated in FIG. 1 are connected to an ink flow passage (not shown) formed in the carriage 26, and also the recording head 25 via the ink flow passage. The ink refill adapter 47 may form a part of the casing 22 that covers the ink tanks 41 to 45, or may be formed integrally with the ink tanks 41 to 45.

Figure 4:
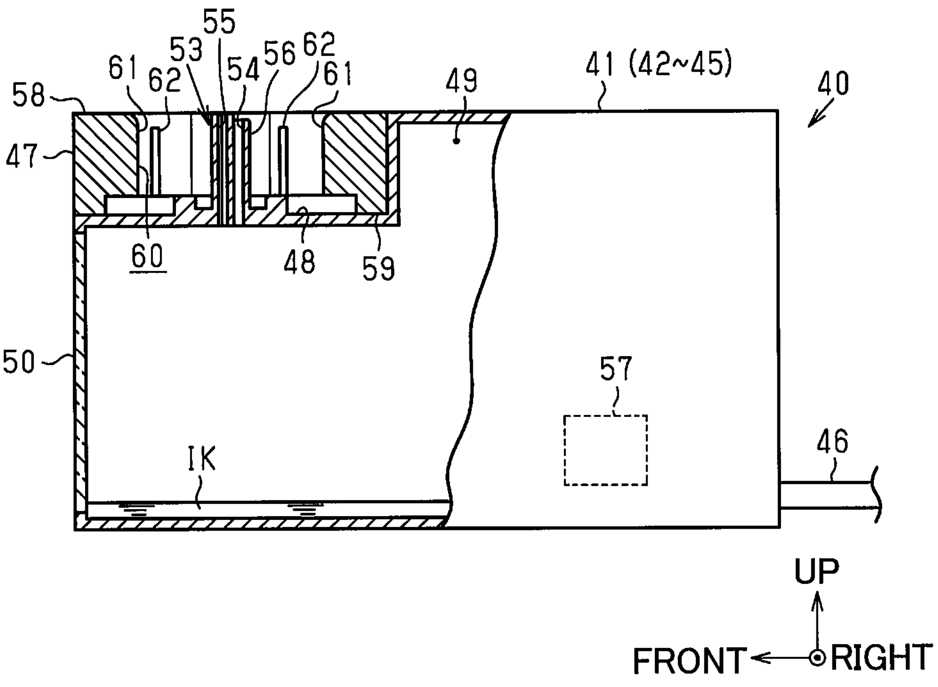
FIG. 4 is a partially broken cross-sectional view along the line 4-4 in FIG. 3.
Figure 5:
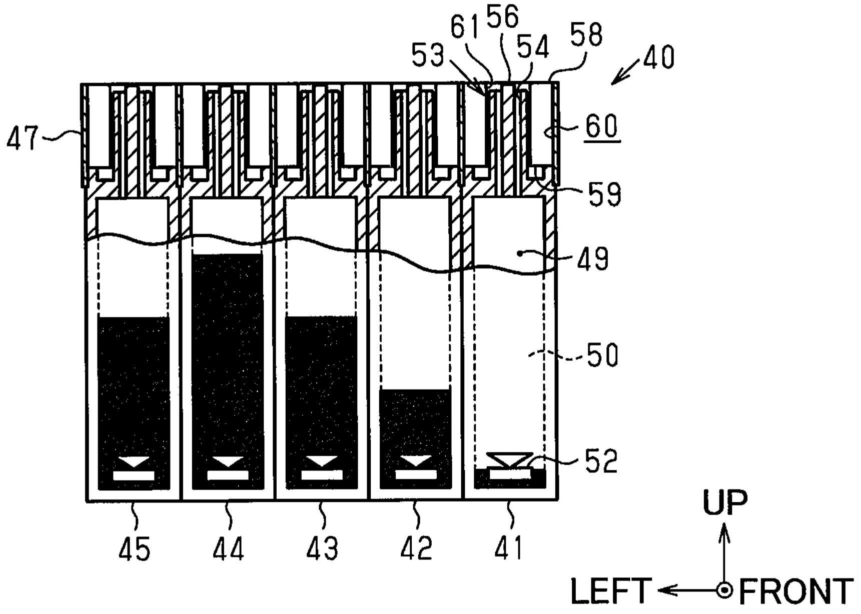
FIG. 5 is a partially broken cross-sectional view along the line 5-5 in FIG. 3.

The ink tanks 41 to 45 illustrated in FIGS. 4 and 5 each include an ink storage chamber 49 that can store an ink IK. In this embodiment, black ink is stored in the ink storage chamber 49 of the ink tank 41 that is located on a right end in a side-by-side direction. Ink of colors other than black (cyan, magenta, yellow, etc.) is stored in the ink storage chambers 49 of the other ink tanks 42 to 45 that are arranged further to the left than the ink tank 41 on the right side in the side-by-side direction. Visual recognition portions 50 formed of a transparent resin that allow a surface of the ink IK in the ink storage chamber 49 to be visually recognized are provided at front wall portions of the ink tanks 41 to 45 that can be visually recognized via the window portion 37 on the front surface of the casing 22. An upper limit marker 51 that indicates an approximate upper limit of the surface of the ink IK stored in the ink storage chamber 49 (example of approximate ink amount that can be injected from the ink inlet 53 without overflowing), and a lower limit marking 52 that indicates an approximate lower limit (for example, an approximate amount for urging ink refill) is written on the visual recognition portion 50.

In the ink tanks 41 to 45 illustrated in FIG. 4, an ink inlet 53 that allows the ink to externally flow into the ink storage chamber 49 is provided on an upper surface on a horizontal portion of the step portion 48. The ink inlet 53 is formed of a needle 56 that extends vertically upward and includes flow passages 54, 55 that communicate the inside of the ink storage chamber 49 to the outside of the ink storage chamber 49. The flow passages 54 and 55 of the needle 56 are formed of two flow passages 54 and 55 that are arranged side by side in a radial direction in which tip openings are centered about the needle 56. One flow passage 54 (the right side in FIG. 4) of the two flow passages 54 and 55 has a tip opening lower than that of the other flow passage 55 (the left side in FIG. 4), and has a bigger cross-sectional area of the flow passage. A remaining ink sensor 57 for detecting a remaining quantity of ink IK in the ink storage chamber 49 is provided on a lower portion closer to the rear in the ink storage chamber 49. The remaining ink sensor 57 may not be provided.

As illustrated in FIGS. 2 to 5, an upper surface 58 of the ink refill adapter 47 is a horizontal surface along a direction perpendicular to (that intersects) a direction in which the needle 56 extends, and a through hole 60 open in an up-down direction until a lower surface 59 is formed in the upper surface 58 as an ink inlet forming portion. The through hole 60 is formed of the circular hole-shaped ink inlet 53 in which the needle 56 is arranged in the center thereof, and a pair of front and rear rectangular portions that continue through the front and back of the ink inlet 53, and an opening on a lower side of the through hole 60 is covered by a horizontal portion of the step portion 48 from which the needle 56 protrudes upward in the ink tanks 41 to 45.

Therefore, in the through hole 60, a pair of front and rear concave portions 61 that open on an upper side in the direction in which the needle 56 extends is formed with a vertical downward direction as a depth direction so as to be point symmetric with respect to the ink inlet 53 by the pair of front and rear rectangular portions that cover the opening on the lower side, in a region that forms an outer side of the ink inlet 53 in a radial direction centered about the ink inlet 53. More specifically, a plurality of (in this case, a pair of front and rear) concave portions 61 that are point symmetrical around the ink inlet 53 are formed in a region that forms an outer side of the ink inlet 53 and includes the needle 56 in the ink refill adapter 47 integral with the ink tanks 41 to 45. In this case, a tip of the needle 56 located at the center of the circular hole-shaped ink inlet 53 is located closer to the ink storage chamber 49 than the upper surface 58 of the ink refill adapter 47 is located to the ink storage chamber 49. The ink refill adapter 47 forms an opening edge of the through hole 60 that includes the ink inlet 53 and the concave portion 61. More specifically, the upper surface 58 of the ink refill adapter 47 extends in a direction that intersects with the direction in which the needle 56 extends at a position further outside than a tip of the needle 56 in the direction in which the needle 56 extends. On the other hand, the lower surface 59 of the ink refill adapter 47 functions as a tank engaging portion configured to engage with the plurality of ink tanks 41 to 45 arranged side by side in the left-right direction as a group from an upper side.

A peripheral portion of the opening edge on an upper side of the through hole 60 on the upper surface 58 of the ink refill adapter 47 is colored a specific color. More specifically, the peripheral portion is colored the same color as the ink stored in the ink storage chamber 49 of the ink tanks 41 to 45 to which the ink flows via the ink inlet 53 of the through hole 60. In this respect, the peripheral portion of the opening edge on the upper side of the through hole 60 in the ink refill adapter 47 functions as a first portion that externally indicates information associated with the ink stored in the ink tanks 41 to 45 in which the ink inlet 53 of the through hole 60 communicates with the ink storage chamber 49. Incidentally, the periphery portion of the upper end opening of the through hole 60 in which the ink inlet 53 that communicates with the ink storage chamber 49 of the ink tank 41 that stores the black ink is colored black.

On an inner surface (more specifically, an inner side surface along an up-down direction) of the concave portion 61, a first concave/convex portion (first key structure portion) 62 that has a characteristically concave/convex shape in the horizontal direction is provided so as to extend along a depth direction (in other words, a central axis direction of the ink inlet 53) at a position in the concave portion 61 that is closer to a bottom surface (more specifically, a horizontal portion side of the step portion 48) than the opening end of the upper surface is to the bottom surface. The first concave/convex portion 62 illustrated in FIGS. 2 and 3 is provided for each ink inlet 53 of the plurality (in this embodiment, five) ink tanks 41 to 45. Therefore, in the ink refill adapter 47, in the rectangular concave portion 61 in the through hole 60 formed at a position that corresponds to each of the ink tanks 41 to 45 in the up-down direction, a first concave/convex portion 62 different to the first concave/convex portion 62 provided on the inner surface of the concave portion 61 of another through hole 60 is formed in each through hole 60. More specifically, these first concave/convex portions 62 function as identification portions that make it possible to identify the ink refill container 63 (see FIG. 6 and the like) that includes the ink outlet 65 (see FIG. 6 and the like) connected to the ink inlet 53 in the through hole 60 in which the first concave/convex portion 62 is formed. A "position in the concave portion 61 that is closer to a bottom surface than the opening edge of the upper surface is to the bottom surface" means any position that is slightly further back toward the bottom surface than the opening edge.

Next, the ink refill container 63 that forms the ink refill system with the ink tanks 41 to 45 and refills the ink to the ink tanks 41 to 45 when the remaining ink quantity is low is described.

Figure 6:
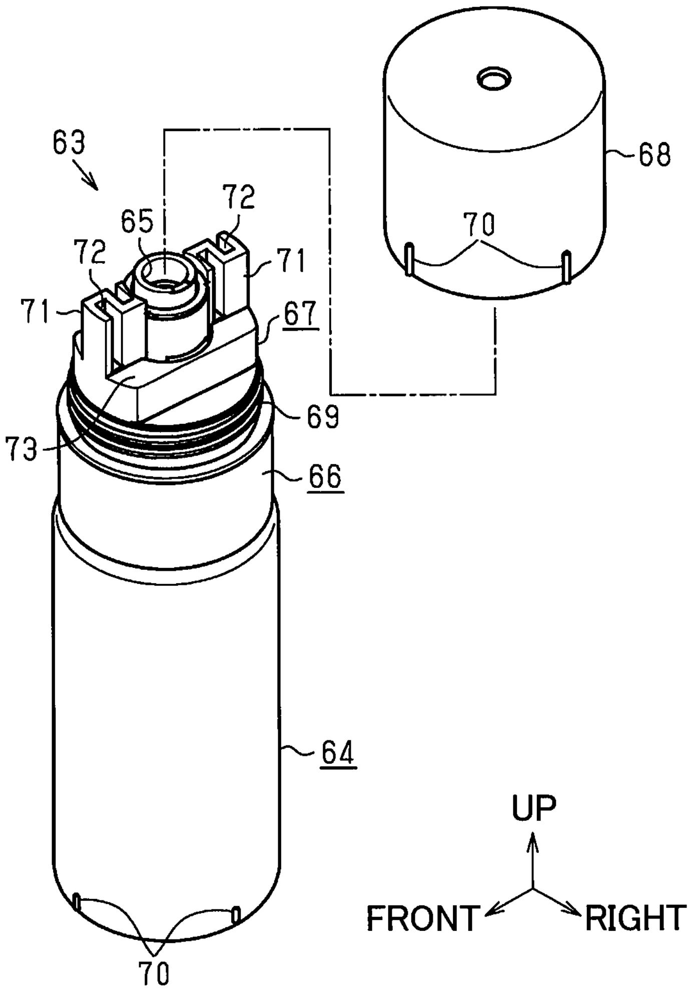
FIG. 6 is a perspective view for illustrating an ink refill container from which a cap has been removed.
Figure 7:
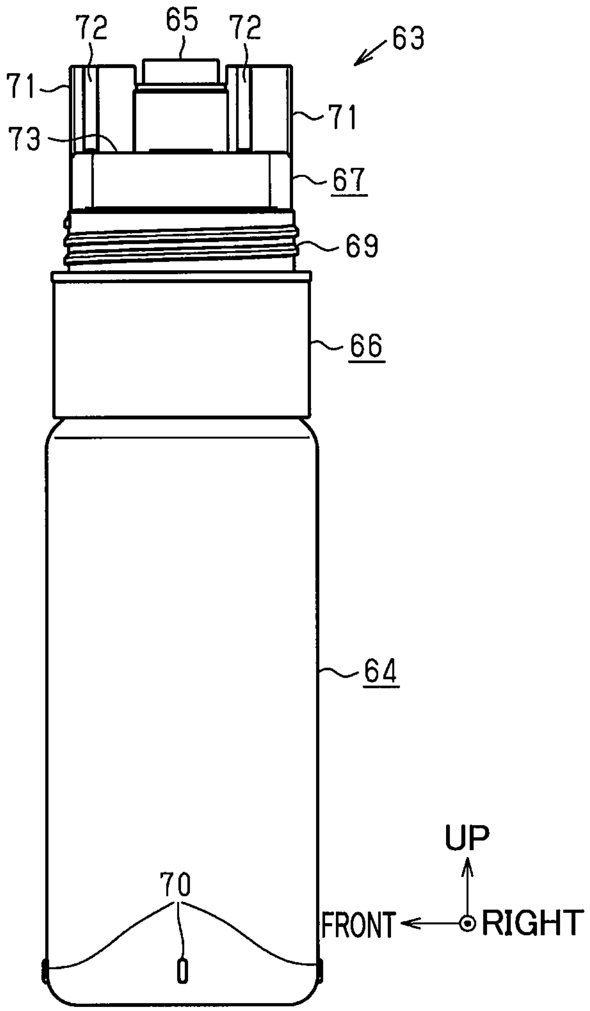
FIG. 7 is a side view for illustrating the ink refill container.
Figure 8:
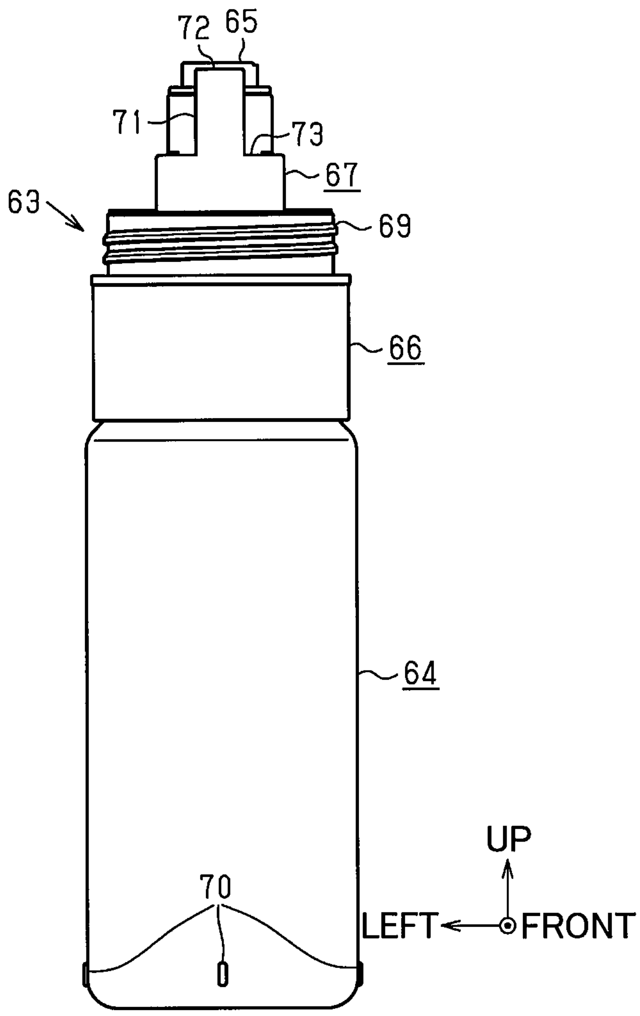
FIG. 8 is a front view for illustrating the ink refill container.

The ink refill container 63 illustrated in FIGS. 6 to 8 includes a tubular container main body 64 that serves as the main part of the ink refill container 63, an ink outlet-forming portion 66 provided at a tip portion of the container main body 64, in which an ink outlet 65 configured to allow the ink to flow out from the ink refill container 63 is formed so as to be open at the top, and a container appendage 67 added to the ink outlet-forming portion 66 so as to surround the ink outlet 65. The ink outlet 65 in the ink outlet-forming portion 66 is covered by a bottomed tubular cap 68 in addition to the container appendage 67 in the periphery thereof, to thereby shield the ink outlet 65 from the outside when the ink refill container 63 is stored. More specifically, a male threaded portion 69 is formed on an outer peripheral surface on a tubular lower end portion of the container appendage 67, and a female threaded portion (not shown) is formed on an inner peripheral surface of the cap 68. The female threaded portion in the cap 68 is threaded onto the male threaded portion 69 of the container appendage 67, to thereby attach the cap 68 to the tip of the ink refill container 63 so as to cover the ink outlet 65.

The entire outer surface of the container appendage 67 is colored a specific color. More specifically, the container appendage 67 is colored the same color as the ink that is stored in the container main body 64 to be added. In this regard, the container appendage 67 in the ink refill container 63 functions as a second portion that externally indicates information associated with the ink stored in the ink refill container 63. Incidentally, the outer surface of the container appendage 67 in the ink refill container 63 that stores the black ink is colored black. In addition, a plurality of (in this embodiment, four) protrusions 70 are formed on outer peripheral surfaces of each of base end portions of the container main body 64 and the cap 68 at equal intervals (at 90° intervals, for example). Incidentally, these protrusions 70 are formed so as to prevent the tubular ink refill container 63 from rolling. In addition, for example, the container main body 64 of the ink refill container 63 that stores the black ink may be formed thicker than the container main body 64 of the ink refill container 63 that stores ink of another color. In this case, the ink outlet-forming portion 66 may be formed of thicknesses and shapes common for black ink and ink of other colors.

As illustrated in FIGS. 6 to 8, a convex portion 71 that protrudes further upward, which is a direction opposite to the container main body 64, than the ink outlet 65 in a central axis direction of the ink outlet 65 is formed in a region that forms an outer side of the ink outlet 65 in a radial direction centered about the ink outlet 65 in a portion higher than a tubular lower end portion formed with the male threaded portion 69 on the outer peripheral surface of the container appendage 67. When a tip of the needle 56 is inserted into the ink outlet 65, the convex portion 71 functions as a second fitting portion which can be fitted with the concave portion 61 of the upper surface 58 of the ink refill adapter 47 as the first fitting portion, and is provided so as to form a pair that sandwiches the ink outlet 65 from the front to the rear similarly to the pair of concave portions 61 sandwiching the ink inlet 53 from the front to the rear. As illustrated in FIGS. 6 and 7, the convex portions 71 are formed further inward than the outer peripheral surface of the container main body 64 in the radial direction centered about the ink outlet 65 in the ink refill container 63.

Figure 9:
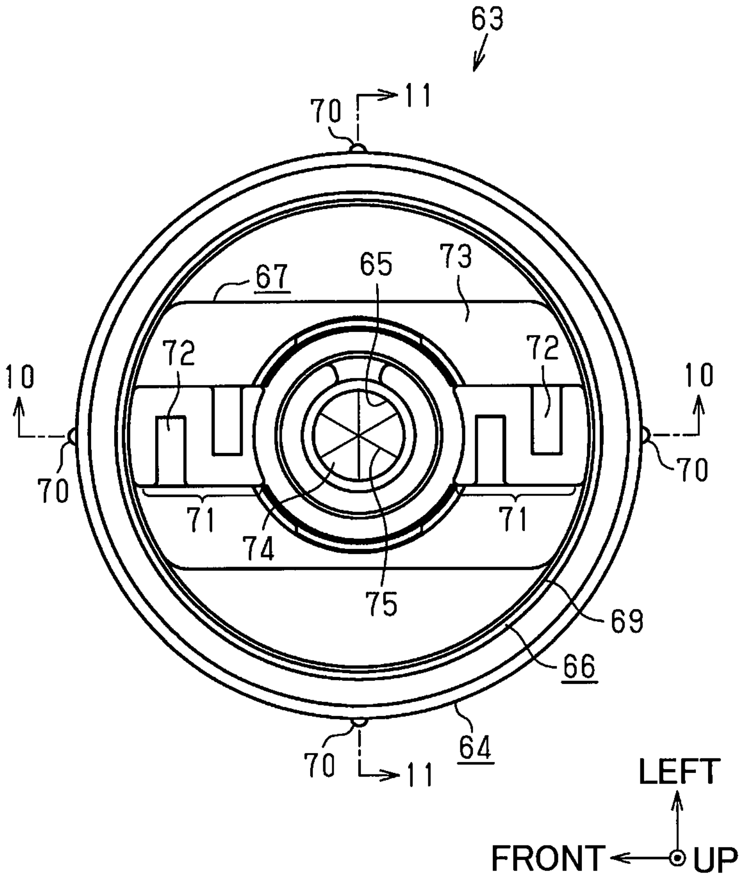
FIG. 9 is a plan view for illustrating the ink refill container.

As illustrated in FIGS. 6 and 9, second concave/convex portions (second key structure portion) 72 that can engage with the first concave/convex portions (first key structure portion) 62 formed on the inner surface of the concave portion 61 of the ink refill adapter 47 are formed on outer surfaces (left and right side surfaces in FIGS. 6 and 9) of each of the convex portions 71. The second concave/convex portions 72 are provided so as to extend along a direction in which the convex portions 71 protrude (in other words, a central axis direction of the ink outlet 65), and cause the convex portion 71 to fit into the concave portion 61. In addition, when the second concave/convex portions 72 are engaged with the first concave/convex portions 62, the second concave/convex portions 72 connect the ink outlet 65 of the ink refill container 63 to the ink inlets 53 of the ink tanks 41 to 45.

A flat positioning portion 73 that is perpendicular to (intersects) the central axis of the ink outlet 65 is provided between a tubular lower end portion formed with the male threaded portion 69 of the container appendage 67 and the convex portion 71 formed with the second concave/convex portion 72 so as to be located radially outward of the ink outlet 65 when the ink outlet 65 is viewed in the direction of its central axis.

More specifically, the positioning portion 73 forms a part of the outer surface of the container appendage 67, which is a part of the outer surface of the ink refill container 63, and is located at a position closer to the container main body 64 than a tip of the convex portion 71 is located to the container main body 64 in the central axis direction of the ink outlet 65. Because the positioning portion 73 is provided in the container appendage 67 added to the ink outlet-forming portion 66 in the ink refill container 63, the positioning portion 73 is configured as a separate member to the ink outlet-forming portion 66, and can be regarded as having a configuration provided on the outer side of the ink outlet-forming portion 66.

As illustrated in FIG. 9, in the ink outlet 65 formed in the ink outlet-forming portion 66, a valve 74 made of an elastic member such as a silicon film is provided to seal the ink outlet 65 in an openable manner. The valve 74 is provided at such a position that the positioning portion 73 is closer to the container main body 64 than the valve 74 is to the container main body 64 in the central axis direction of the ink outlet 65 (see FIG. 14, for example). The valve 74 is provided with a plurality of (in this embodiment, three) slits 75 that intersect at equal angular intervals (for example, 1200 intervals) with their centers as intersection points, and these slits 75 are configured so as to open when pushed from outside the ink outlet 65. More specifically, when the tip of the needle 56 on the ink inlet 53 side is inserted into the ink outlet 65, the normally closed valve 74 opens by being pushed inward by the tip of the needle 56.

At this time, the positioning portion 73 on the outer side of the ink outlet 65 in the radial direction abuts against the upper surface 58 of the ink refill adapter 47 formed with the through hole 60 that includes the ink inlet 53 and the concave portion 61, to thereby position the valve 74 with respect to the ink tanks 41 to 45 in the central axis direction of the ink outlet 65. In this regard, the upper surface 58 of the ink refill adapter 47 corresponds to a part of the ink tanks 41 to 45 on which the positioning portion 73 of the ink refill container 63 abuts when the valve 74 of the ink outlet 65 of the ink refill container 63 for refilling the ink to the ink tanks 41 to 45 opens, and functions as a receiving surface for receiving the flat positioning portion 73.

Figure 38:
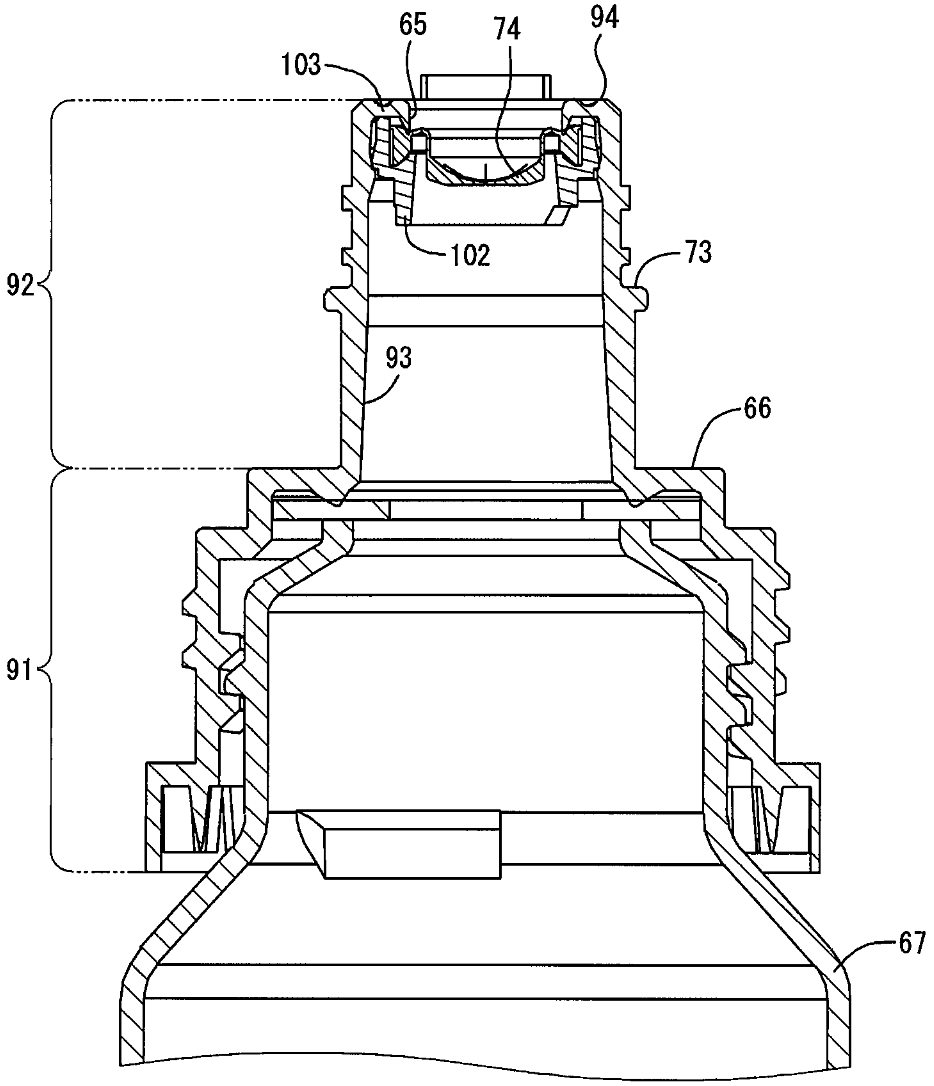
FIG. 38 is a cross-sectional view for illustrating an ink outlet-forming portion.
Figure 39:
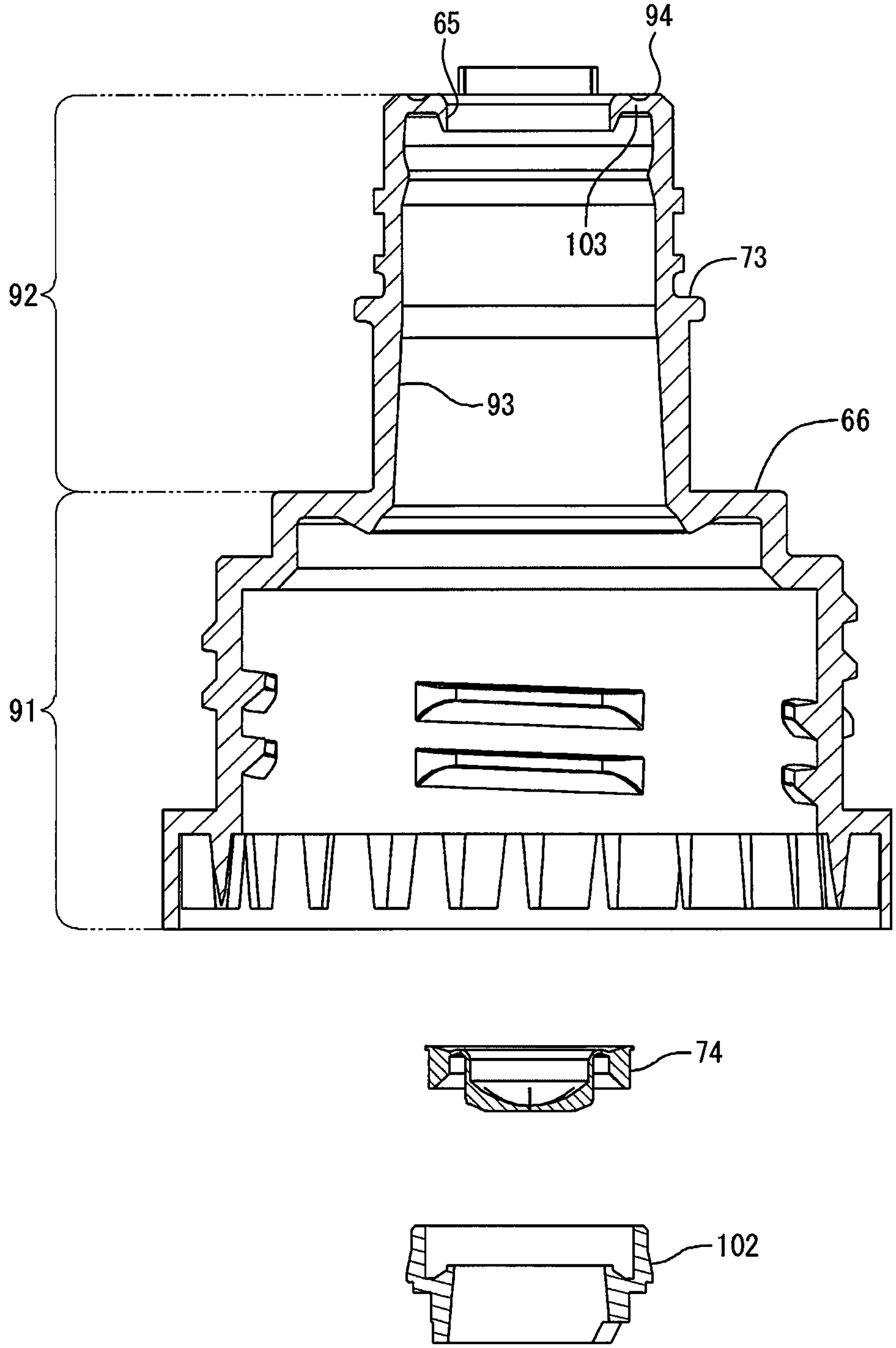
FIG. 39 is a cross-sectional view for illustrating the ink outlet-forming portion, a valve, and a holder.

The valve 74 may be formed as illustrated in FIGS. 38 and 39. As illustrated in FIG. 38, the valve 74 and a holder 102 are provided in the ink outlet-forming portion 66. The valve 74 seals the ink outlet 65 in an openable manner. In the ink outlet-forming portion 66, the valve 74 is provided in an outflow passage 93, and the ink outlet 65 is sealed from within the outflow passage 93 in an openable manner. The valve 74 is formed of an elastic material such as rubber or an elastomer, and seals the ink outlet 65 under a state in which external force does not act on the valve 74. The valve 74 opens when a connection conduit (needle 56) in the ink tanks 41 to 45 is inserted into the ink outlet 65, and pressing force acts on the valve 74 due to the connection conduit 56. Then, the valve 74 closes when the connection conduit (needle 56) is removed from the ink outlet 65 and the external force acting on the valve 74 is released.

As illustrated in FIG. 39, the valve 74 and the holder 102 are configured so as to be separated from the ink outlet-forming portion 66. In other words, the ink outlet-forming portion 66, the valve 74, and the holder 102 are configured with separate members from one another. The valve 74 is inserted into the outflow passage 93 from a joining portion 91 of the ink outlet-forming portion 66. The holder 102 is a component for restricting the valve 74 from falling and, as illustrated in FIG. 38, is provided on a joining portion 91 side of the valve 74. The holder 102 is also inserted into the outflow passage 93 from the joining portion 91 side of the ink outlet-forming portion 66. The valve 74 is sandwiched by the holder 102 and a flange portion 103 of the ink outlet-forming portion 66. With this configuration, the ink outlet-forming portion 66, the valve 74, and the holder 102 are assembled integrally. The flange portion 103 is a wall that extends in an inner radial direction of a tubular portion 92 from an internal side surface of the tubular portion 92. A surface on a side opposite to the joining portion 91 of the flange portion 103 corresponds to an edge surface 94.

Figure 10:
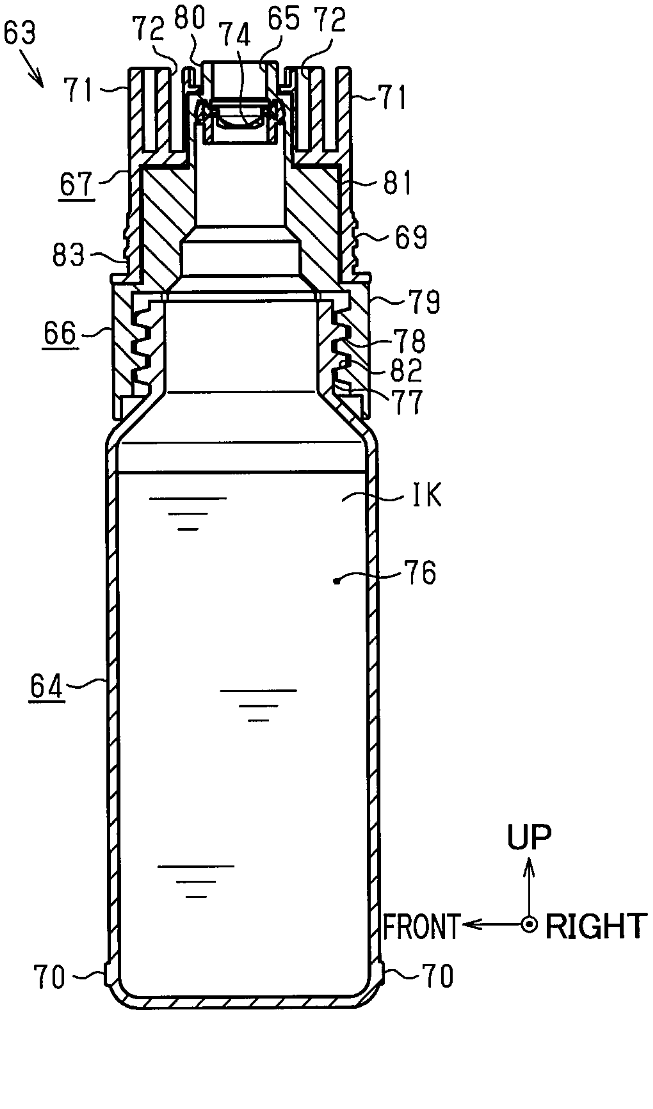
FIG. 10 is a cross-sectional view along the line 10-10 in FIG. 9.
Figure 11:
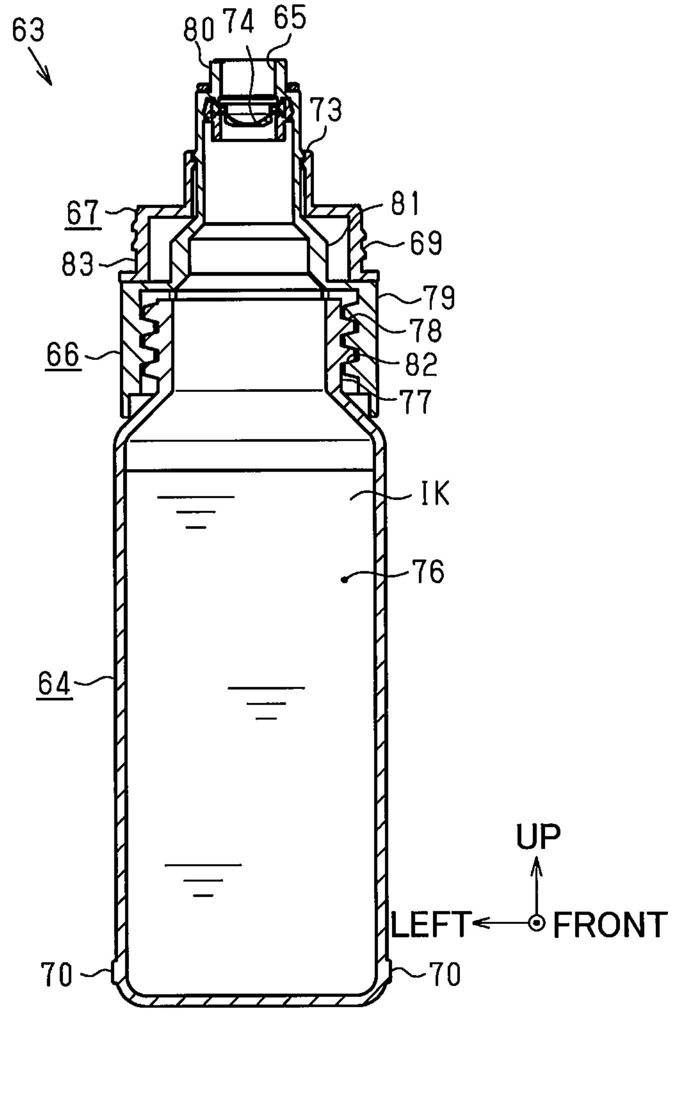
FIG. 11 is a cross-sectional view along the line 11-11 in FIG. 9.

As illustrated in FIGS. 10 and 11, the container main body 64 in the ink refill container 63 is a bottle-shaped member that includes the ink storage chamber 76 that can store the ink IK, and the male threaded portion 78 is formed on an outer peripheral surface of a neck portion 77 on an upper end portion of the container main body 64. The ink outlet-forming portion 66 provided on the upper end portion of the container main body 64 includes a large-diameter portion 79 located on an outer peripheral side of the neck portion 77 of the container main body 64, a small-diameter portion 80 that forms the ink outlet 65 at a position furthest away from the container main body 64, and an intermediate portion 81 that connects the large-diameter portion 79 and the small-diameter portion 80. The female threaded portion 82 formed on an inner peripheral surface of the large-diameter portion 79 is threaded into the male threaded portion 78 formed on the outer peripheral surface of the neck portion 77 of the container main body 64, to thereby mount the ink outlet-forming portion 66 to an upper end portion of the container main body 64.

On the container appendage 67 added to the ink outlet-forming portion 66 in the ink refill container 63 so as to surround the ink outlet 65, a tubular lower end portion formed with the male threaded portion 69 on the outer peripheral surface forms a junction 83 that joins a lower end surface of the container appendage 67 to an upper end surface of the large-diameter portion 79 of the ink outlet-forming portion 66. The surface area of the inner circumferential surface of the joining portion 83 facing in the front-rear direction is in surface contact with the outer surface on the front side and the outer surface on the rear side of the intermediate portion 81 of the ink outlet forming portion 66, so as to be joined to the large-diameter portion 79 of the ink outlet forming portion 66.

Next, operation of the ink refill system configured as described above is described, focusing on operation when ink is refilled to the ink tanks 41 to 45 in the ink refill unit 40 using the ink refill container 63.

As a prerequisite, as illustrated in FIG. 2, because the surface height of the ink in the ink tank 41 for black ink located furthest to the right among the plurality of ink tanks 41 to 45 arranged side by side has fallen to the height of the lower limit marker 52 written on the lower portion of the visual recognition portion 50, a case in which the ink is refilled to the ink tank 41 is described below. In addition, it is assumed that enough black ink is stored in the ink refill container 63 used to refill the ink, and that the cap 68 has already been removed from the ink refill container 63. It is also assumed that the shape of the second concave/convex portion 72 formed on the outer surface of the convex portion 71 of the ink refill container 63 matches the shape of the first concave/convex portion 62 formed on the inner surface of the concave portion 61 located front and back of the ink inlet

53 of the ink tank 41, and that these concave/convex portions can be engaged by the convex portion 71 being inserted into the concave portion 61.

When the ink is refilled to the ink tank 41, the user first changes the state of the open/close door 35 of the casing 22 from the closed state illustrated in FIG. 1 to an open state by rotating the open/close door 35 to the front about the rotation axis 36. Then, in the ink refill unit 40, the upper surface 58 of the ink refill adapter 47 formed with the ink inlet 53 of the ink tanks 41 to 45 is exposed to the outside of the casing 22, and the user can connect the ink outlet 65 of the ink refill container 63 to the desired ink inlet 53 from above.

Figure 12:
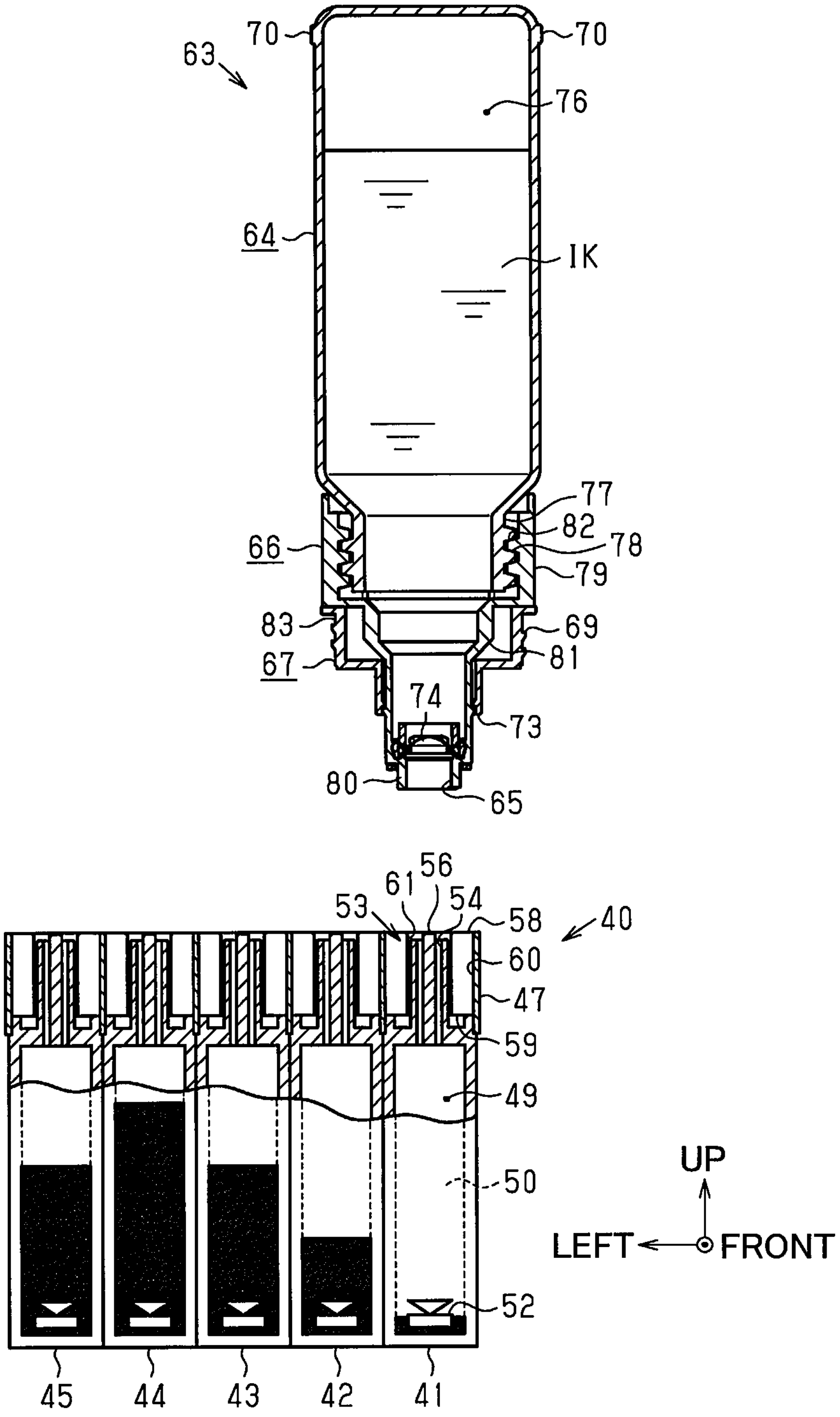
FIG. 12 is a partially broken cross-sectional front view for illustrating a state directly before ink is refilled to the ink tank.
Figure 13:
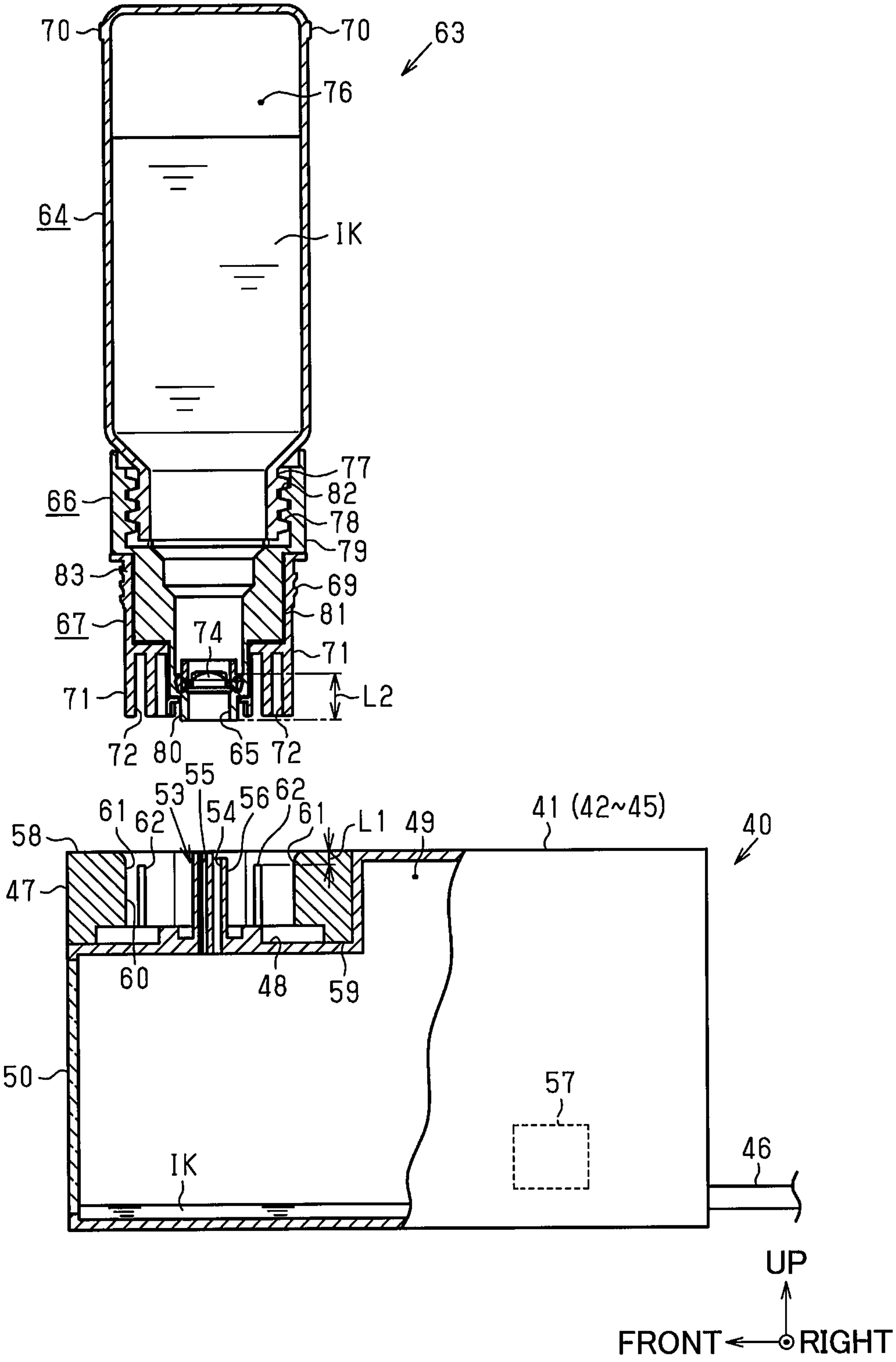
FIG. 13 is a partially broken cross-sectional side view for illustrating a state directly before the ink is refilled to the ink tank.

Then, as illustrated in FIGS. 12 and 13, the user turns the ink refill container 63 that stores the black ink to be used for ink refill upside down, and holds the ink refill container 63 so that the ink outlet 65 is located above the through hole 60 on the further right side of the ink refill adapter 47. More specifically, a central axis line of the ink outlet 65 of the ink refill container 63 is matched with a central axis line of the ink inlet 53 of the ink tank 41 of the ink to be refilled. At this time, the user compares the color (second portion) of the container appendage 67 of the ink refill container 63 that the user is holding, and the color (first portion) around the opening edge on the upper side of the through hole 60 provided with the ink inlet 53 of the ink tank 41 of the ink to be refilled at that time. Then, if the two colors are the same (in this case, both black), the user checks that they are holding the appropriate ink refill container 63 for the ink refill this time, and proceeds to subsequent operations for the ink refill.

Then, the user lowers ink refill container 63 from the state illustrated in FIGS. 12 and 13, and inserts the convex portion 71 of that ink refill container 63 into the concave portion 61 of the ink refill adapter 47 integral with the ink tank 41. Then, by realizing insertion of the convex portion 71 to the concave portion 61, the matching state of the central axis line of the ink outlet 65 with respect to the central axis line of the ink inlet 53 is secured. In this case, because the concave portion 61 is located at a position point symmetrical to the needle 56, which is at the center of the ink inlet 53, the convex portion 71 can be inserted into any concave portion 61. Therefore, there is no need to check the appropriate positional relationship between the concave portion 61 and the convex portion 71 by repeatedly rotating the ink refill container 63 about the center axis line of the ink outlet 65, and the user can easily insert the convex portion 71 into the concave portion 61.

However, at this time, although the tip of the needle 56 located at the center of the ink inlet 53 is also inserted into the opening of the ink outlet 65 that protrudes slightly from the tip of the convex portion 71 by the convex portion 71 being slightly inserted into the concave portion 61, the tip does not reach the valve 74 located deep inside the ink outlet 65. The reason for this is as follows. As illustrated in FIG. 13, a distance L2 between the tip of the convex portion 71 and the valve 74 in the ink outlet 65 is longer than a distance L1 between the upper surface 58 of the ink refill adapter 47 where the opening edge of the concave portion 61 is located and the upper end of the first concave/convex portion 62 in the concave portion 61. As a result, when the convex portion 71 is further inserted downward in the depth direction of the concave portion 61 from that state, the second concave/convex portion 72 on the outer surface of the convex portion 71 engages with the first concave/convex portion 62 on the inner surface of the concave portion 61. Then, when the convex portion 71 is further inserted into toward the bottom surface side in the depth direction of the concave portion 61 while maintaining that engagement state, the top of the needle 56 of the ink inlet 53 reaches the position of the valve 74 of the ink outlet 65, and the valve 74 opens.

Figure 14:
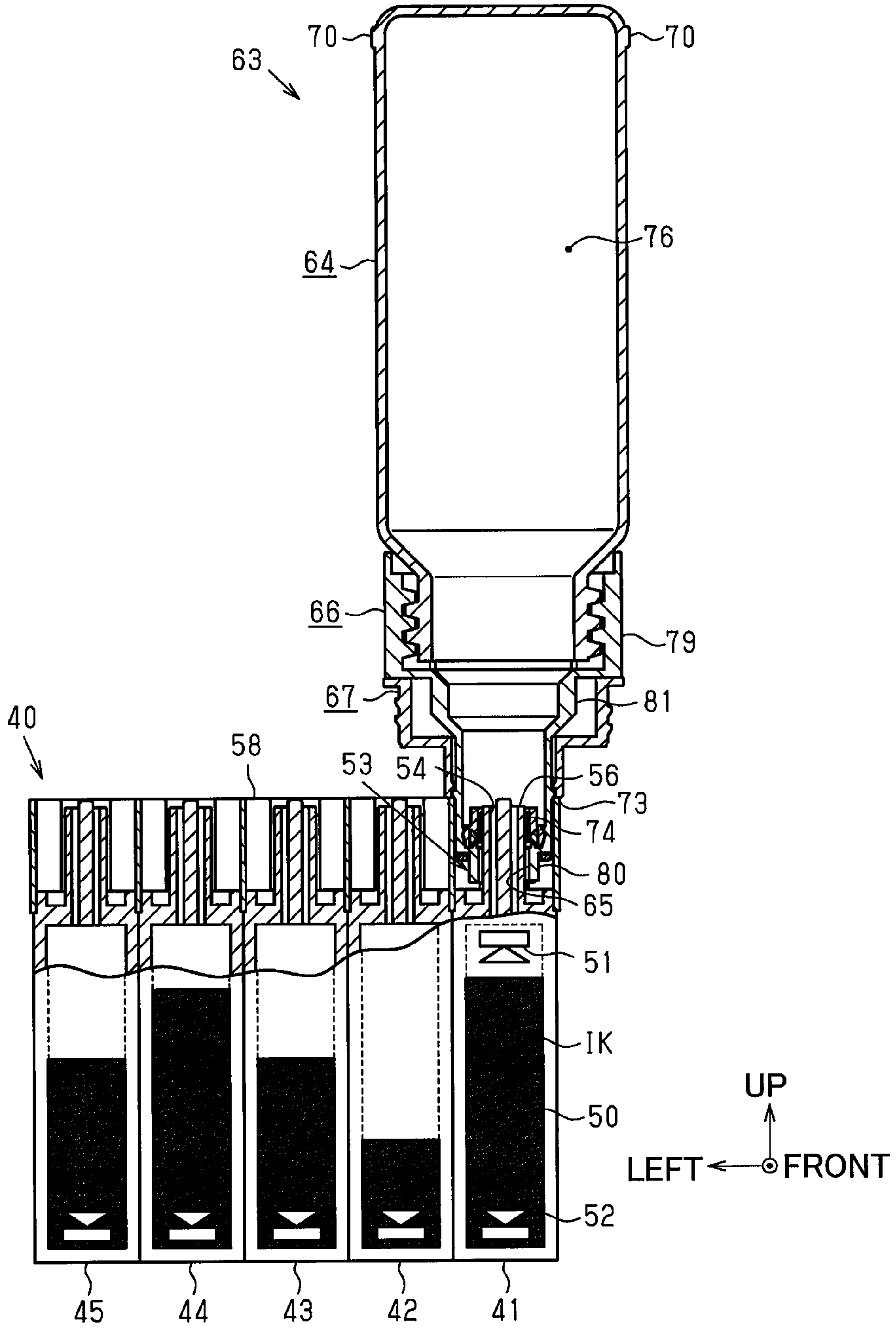
FIG. 14 is a partially broken cross-sectional front view for illustrating a state while the ink is being refilled to the ink tank.
Figure 15:
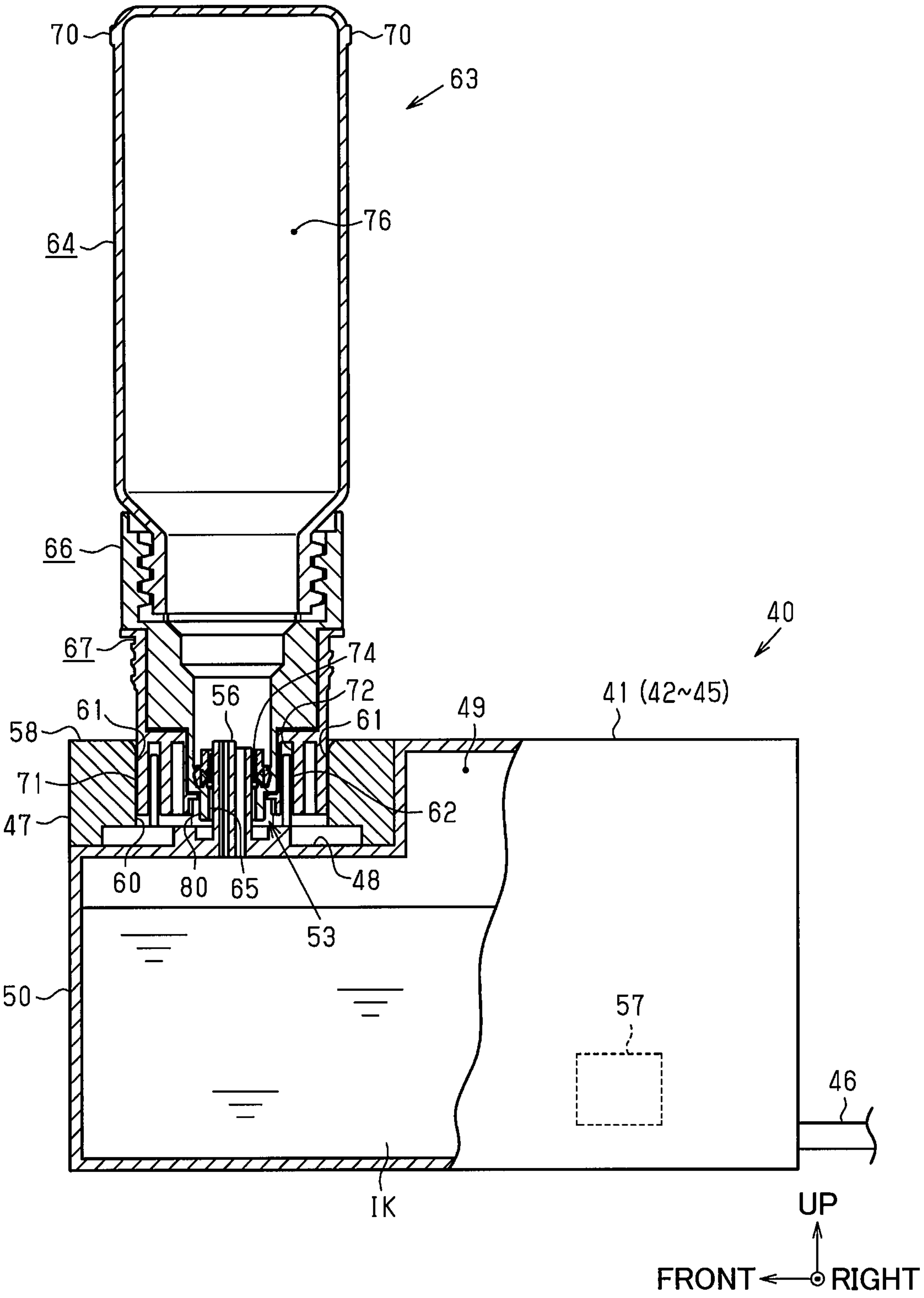
FIG. 15 is a partially broken cross-sectional side view for illustrating a state while the ink is being refilled to the ink tank.

More specifically, as illustrated in FIGS. 14 and 15, the tip of the needle 56 pushes the slit 75 upward (that is, inward from the ink outlet 65) from the valve 74, to thereby change the valve 74 to the open state. As a result, the ink outlet 65 of the ink refill container 63 and the needle 56 of the ink inlet 53 of the ink tank 41 become connected, and the black ink is refilled to the ink tank 41 from the ink refill container 63. As this time, one of the two flow passages 54 and 55 in which the tip opening first touches the ink flowing out from the ink outlet 65 by the needle 56 of the ink inlet 53 opening the valve 74 functions as an ink flow path through which ink flows, and the other flow passage functions as an air flow passage for circulating air. For example, when the user tries to connect the ink outlet 65 to the ink inlet 53 while the ink refill container 63 is inclined, the flow passage as the ink flow passage among the two flow passages 54 and 55 changes depending on a different of the direction of inclination.

If the second concave/convex portion 72 is not engaged with the first concave/convex portion 62 after the convex portion 71 has been inserted into the concave portion 61, at that time, the user can recognize that they are trying to incorrectly insert an ink refill container 63 of a color other than black. In this case, if an upper end of the first concave/convex portion 62 is located at the same height as the opening edge of the concave portion 61, engagement of the second concave/convex portion 72 to the first concave/convex portion 62 is rejected, and insertion of the convex portion 71 to the concave portion 61 is also rejected. Therefore, the user may try to insert the convex portion 71 into the concave portion 61 many times and waste time performing a useless action. In this regard, in this embodiment, the height of the first concave/convex portion 62 is lower than that of the opening edge of the concave portion 61, and hence the convex portion 71 can be easily guided to the bottom surface side of the concave portion 61 in the depth direction when being inserted to the concave portion 61, and operation time is not wastefully long.

Figure 16:
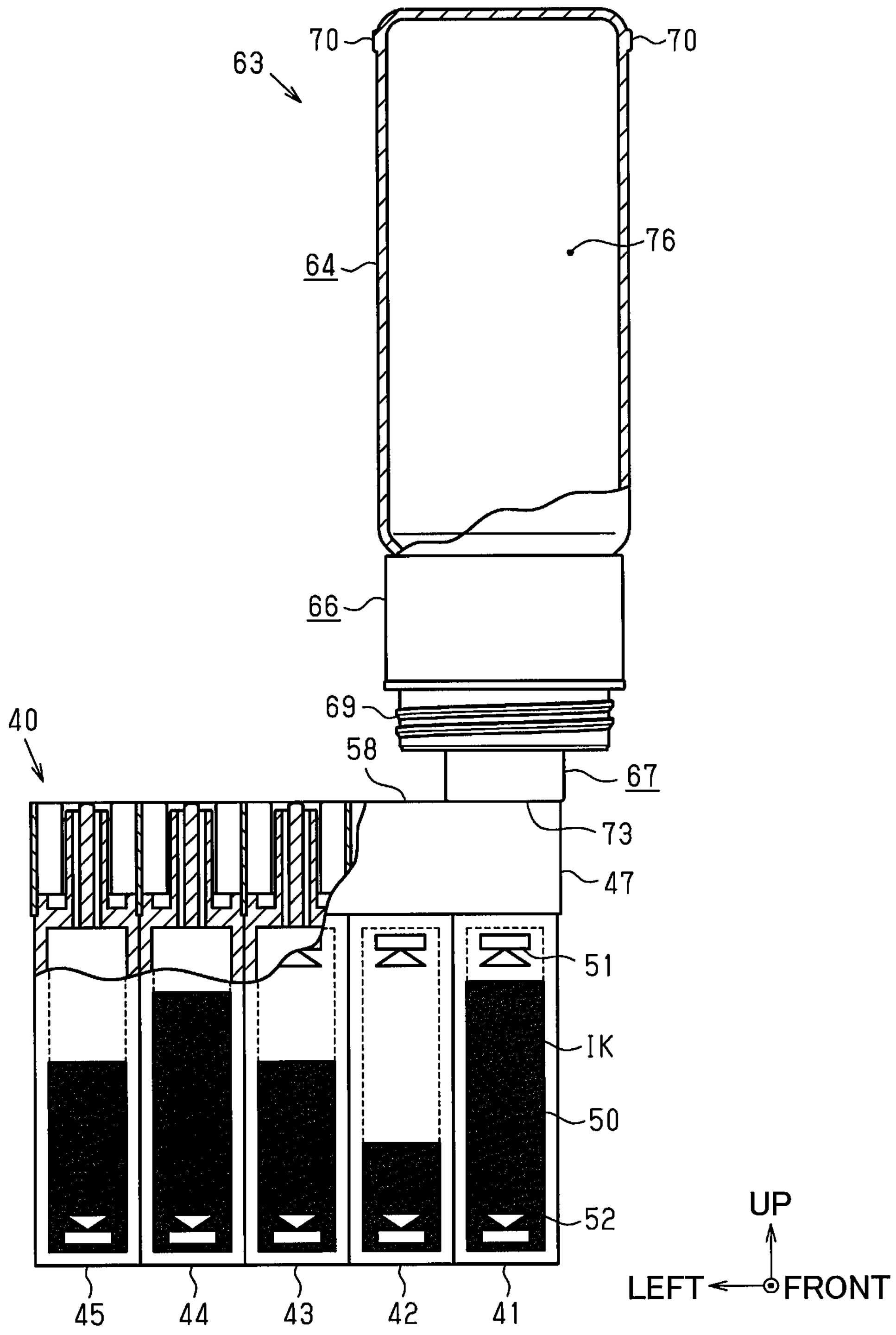
FIG. 16 is a partially broken cross-sectional front view for illustrating a state in which a positioning portion of the ink refill container abuts against a receiving surface of the ink tank when the ink is refilled.
Figure 17:
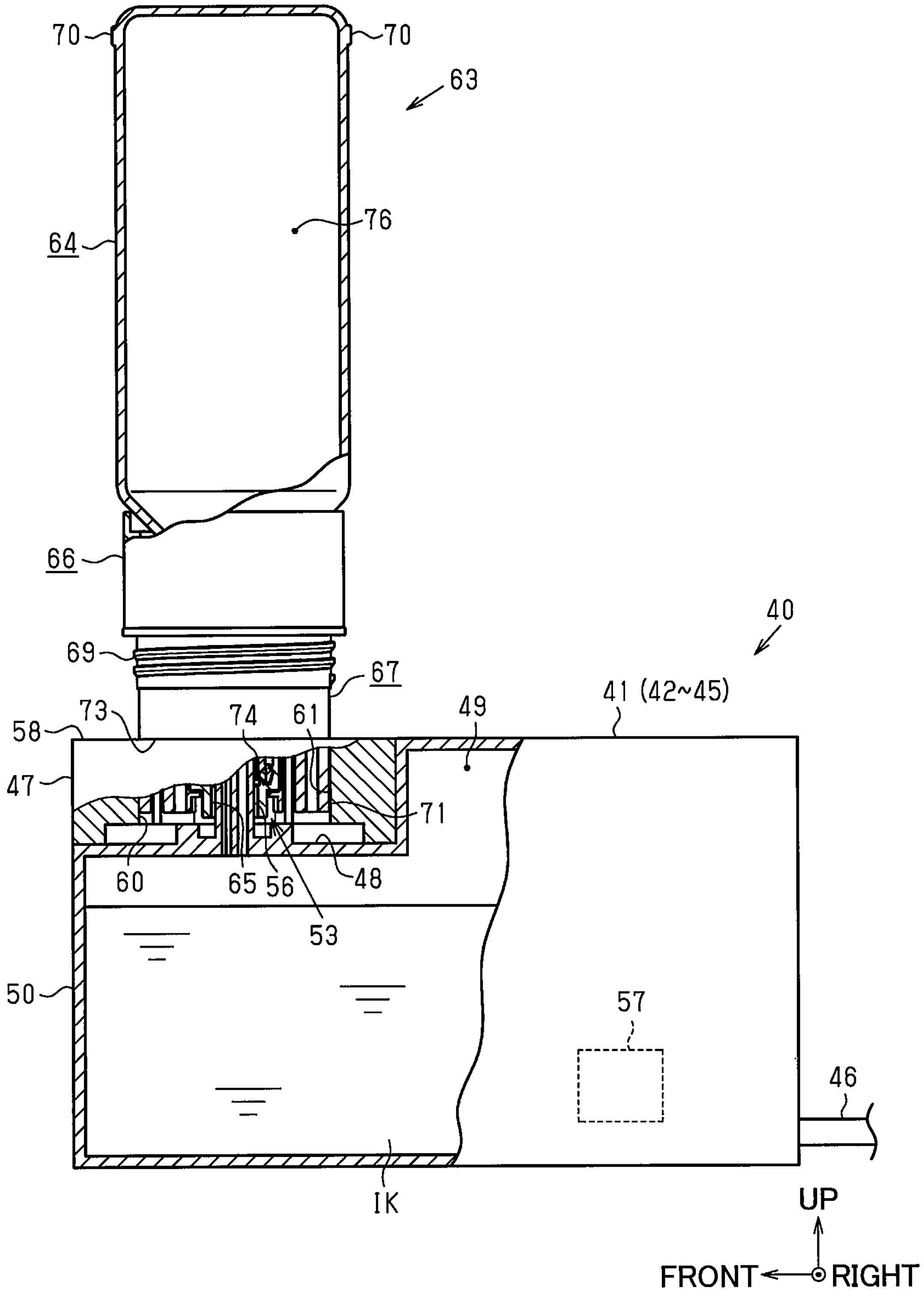
FIG. 17 is a partially broken cross-sectional side view for illustrating a state in which the positioning portion of the ink refill container abuts against the receiving surface of the ink tank when the ink is refilled.

In addition, as illustrated in FIGS. 14, 16 and 17, when the valve 74 in the ink outlet 65 of the ink refill container 63 is opened by the needle 56 of the ink inlet 53 on the ink tank 41 side, the positioning portion 73 in the ink refill container 63 abuts against the upper surface 58 of the ink refill adapter 47, which is a part of the ink tank 41 side. More specifically, the positioning portion 73 in the ink refill container 63 abuts against the upper surface 58 of the ink refill adapter 47, to thereby open the valve 74 under a state in which the valve 74 is positioned in the central axis direction of the ink outlet 65 with respect to the needle 56 on the ink tank 41 side.

At that time, because the positioning portion 73 is located radially outward of the ink outlet 65, the orientation of the ink refill container 63 in which the ink outlet 65 is connected to the ink inlet 53 can be stably maintained. In addition, as illustrated in FIGS. 14 and 15, when the positioning portion 73 of the ink refill container 63 abuts against the upper surface 58 of the ink refill adapter 47, a gap exists between a bottom surface of the ink inlet 53 where the base end of the needle 56 in the ink inlet 53 is located, and a tip of the ink outlet 65 of the ink refill container 63. Therefore, ink easily collects on the bottom surface of the ink inlet 53 where the base end of the needle 56 in the ink inlet 53 is located, but the collected ink can be prevented from adhering to the tip of the ink outlet 65 and contaminating the ink refill container 63.

As illustrated in FIGS. 14 and 16, when the ink refill to the ink tank 41 from the ink refill container 63 is complete, if the surface height of the ink in the ink tank 41 is still lower than the upper limit marker 51 of the visual recognition portion 50, ink refill may be performed again using another black ink refill container 63 until the surface reaches the upper limit marker 51. The above-described ink refill operation is similarly performed for the ink tanks 42 to 45 of colors different to that of the ink tank 41 for black ink.

According to the above-described first embodiment, the following effects can be achieved.

(1) During the ink refill to the ink tanks 41 to 45 from the ink refill container 63, the valve 74 is opened while being positioned with respect to the ink tanks 41 to 45. Therefore, ink spillage and incorrect ink refilling that may occur when the valve 74 displaces when the valve 74 opens can be suppressed, and the ink can be appropriately refilled to the ink tanks 41 to 45.

(2) Because the valve 74 is configured as a slit valve provided with the one or more slits 75 in an elastic member such as a silicon film, the ink refill container 63 can be provided with few components and a simple structure.

(3) Because the positioning portion 73 in the ink refill container 63 abuts against part of the ink tanks 41 to 45 while being located radially outward of the ink outlet 65 when the ink is refilled to the ink tanks 41 to 45 from the ink refill container 63, the ink can be refilled at a stable orientation.

(4) Because the positioning portion 73 in the ink refill container 63 is provided to the container appendage 67 as a member separate to the ink outlet-forming portion 66, the positioning portion 73 can be optimized in accordance with design specifications of the ink tanks 41 to 45 and the ink refill container 63.

(5) When the needle 56 of the ink tanks 41 to 45 in the ink outlet 65 of the ink refill container 63 is inserted into the valve 74 to open the valve 74, the positioning portion 73 of the ink refill container 63 abuts against the upper surface 58 of the ink refill adapter 47 that functions as a receiving surface of the ink refill container 63 in the ink tanks 41 to 45 to determine the relative positional relationship between the valve 74 and the needle 56. Therefore, the valve 74 can be appropriately opened by the needle 56, and the occurrence of incorrect ink refilling can be suppressed.

(6) When the ink is refilled, because the needle 56 is not inserted into the ink outlet 65 if the convex portion 71 of the ink refill container 63 is not fitted into the concave portion 61 of the ink tanks 41 to 45, inappropriate connection between the ink tanks 41 to 45 and the ink refill container 63 can be suppressed.

(7) The ink refill container 63 includes the positioning portion 73 on an outer side of the ink outlet-forming portion 66 at a position closer to the container main body 64 than the convex portion 71 is to the container main body 64 in the central axis direction of the ink outlet 65. Therefore, inappropriate connection between the ink tanks 41 to 45 and the ink refill container 63 can be suppressed, and the insertion of the needle 56 of the ink tanks 41 to 45 to the ink outlet 65 of the ink refill container 63 can be guaranteed at an appropriate position.

(8) Because the tip of the needle 56 of the ink tanks 41 to 45 does not protrude further outward than the upper surface 58 of the ink refill adapter 47 that acts as the receiving surface of the positioning portion 73 of the ink refill container 63, even if ink adheres to the tip of the needle 56, the risk of that ink adhering to the hand of a user who performs the ink refill, or the ink refill container 63 can be reduced.

(9) When connection is performed from the direction in which the needle 56 extends from the ink tanks 41 to 45 with the ink refill container 63 in a state inclined along a radial direction in which the two flow passages 54 and 55 are arranged, one of the two flow passages 54, 55 on a side on which the ink outlet 65 of the ink refill container 63 first approaches acts as an ink flow passage, and the other flow passage acts as an air flow passage. Therefore, because the user may use either of the two flow passages 54 and 55 as the ink flow passage, the user can quickly refill the ink without hesitating in choosing the flow passage to be the ink flow passage.

(10) Through fitting the convex portion 71 of the ink refill container 63 into the concave portion 61 of the ink tanks 41 to 45, and engaging the second concave/convex portion 72 on the outer surface of the convex portion 71 with the first concave/convex portion 62 on the inner surface of the concave portion 61, the user can recognize that the appropriate ink refill container 63 has been connected to the ink tanks 41 to 45. As a result, inappropriate connection between the ink tanks 41 to 45 and the ink refill container 63 can be suppressed. In addition, because the first concave/convex portion 62 is closer to the bottom than the opening edge of the concave portion 61 is to the bottom inside of the concave portion 61 of the ink tanks 41 to 45, the convex portion 71 in the ink refill container 63 can be easily guided to the bottom from the opening of the concave portion 61 in the ink tanks 41 to 45, and insertion can be made easily.

(11) The second concave/convex portion 72 (second key structure portion) on the outer surface of the convex portion 71 in the ink refill container 63 can be engaged with the first concave/convex portion (first key structure portion) 62 provided so as to extend along the depth direction of the concave portion 61 on the inner surface of the concave portion 61 of the ink tanks 41 to 45 by making the convex portion 71 fit into the concave portion 61. As a result, the connection direction of the ink outlet 65 of the ink refill container 63 to the ink inlet 53 of the ink tanks 41 to 45 can be easily recognized.

(12) Because the depth direction of the concave portion 61 provided radially outward of the ink inlet 53 is a direction that faces vertically downward, the ink can be prevented from returning to the ink storage chamber 76 from the ink outlet 65 of the ink refill container 63 under a state in which the ink outlet 65 of the ink refill container 63 is connected to the ink inlet 53 of the ink tanks 41 to 45. As a result, the ink can be appropriately refilled to the ink tanks 41 to 45 from the ink refill container 63.

(13) Even when the convex portion (second fitting portion) 71 of the ink refill container 63 is fitted into any of the plurality of concave portions (first fitting portions) 61 formed point symmetrical about the ink inlet 53 in the ink tanks 41 to 45, the ink outlet 65 of the ink refill container 63 can be connected to the ink inlet 53 of the ink tanks 41 to 45. Therefore, it is easy to connect to the ink tanks 41 to 45 of the ink refill container 63 when the ink is refilled.

(14) The color of the peripheral portion of the ink inlet 53 of the ink refill adapter 47 in the ink tanks 41 to 45 functions as the first portion for indicating information associated with the ink stored in the ink storage chamber 49, and the color of the container appendage 67 of the ink refill container 63 functions as the second portion for indicating information associated with the ink stored in the ink storage chamber 76. Therefore, when the ink is refilled by connecting the ink refill container 63 to the ink tanks 41 to 45, whether or not the ink to be refilled is appropriate can be easily checked by visually confirming the first portion on the ink tank 41 to 45 side and the second portion on the ink refill container 63 side.

(15) Because the ink refill container 63 is formed further inward than the outer peripheral surface of the container main body 64 provided with the ink storage chamber 76 in the radial direction in which the convex portions 71 are centered about the ink outlet 65, the convex portions 71 of the ink refill container 63 are less likely to become a hindrance when the ink outlet 65 of the ink refill container 63 is connected to the ink inlet 53 of the ink tanks 41 to 45.

(16) The ink refill adapter 47 includes the plurality of first concave/convex portions (identification portions) 62 that make it possible to identify the ink refill container 63 containing the ink outlet 65 that can connect to the ink inlet 53 of every ink tank 41 to 45 when the ink refill adapter 47 engages the lower surface (tank engaging portion) 59 with the plurality of ink tanks 41 to 45 as a group. Therefore, if the ink tanks 41 to 45 have a general common structure, and the lower surface 59 as the tank engaging portion of the ink refill adapter 47 is engaged with the plurality of ink tanks 41 to 45 as a group, a simple structure that can suppress incorrectly mounting the ink refill container 63 when the ink is refilled can be obtained.

Second Embodiment

Next, a second embodiment of a recording device is described with reference to the drawings. Positioning of the ink tank and the ink refill adapter in the second embodiment differs from that in the first embodiment. Other aspects are substantially the same as those in the first embodiment, and hence redundant description is omitted by denoting like configurations with like reference symbols.

Figure 18:
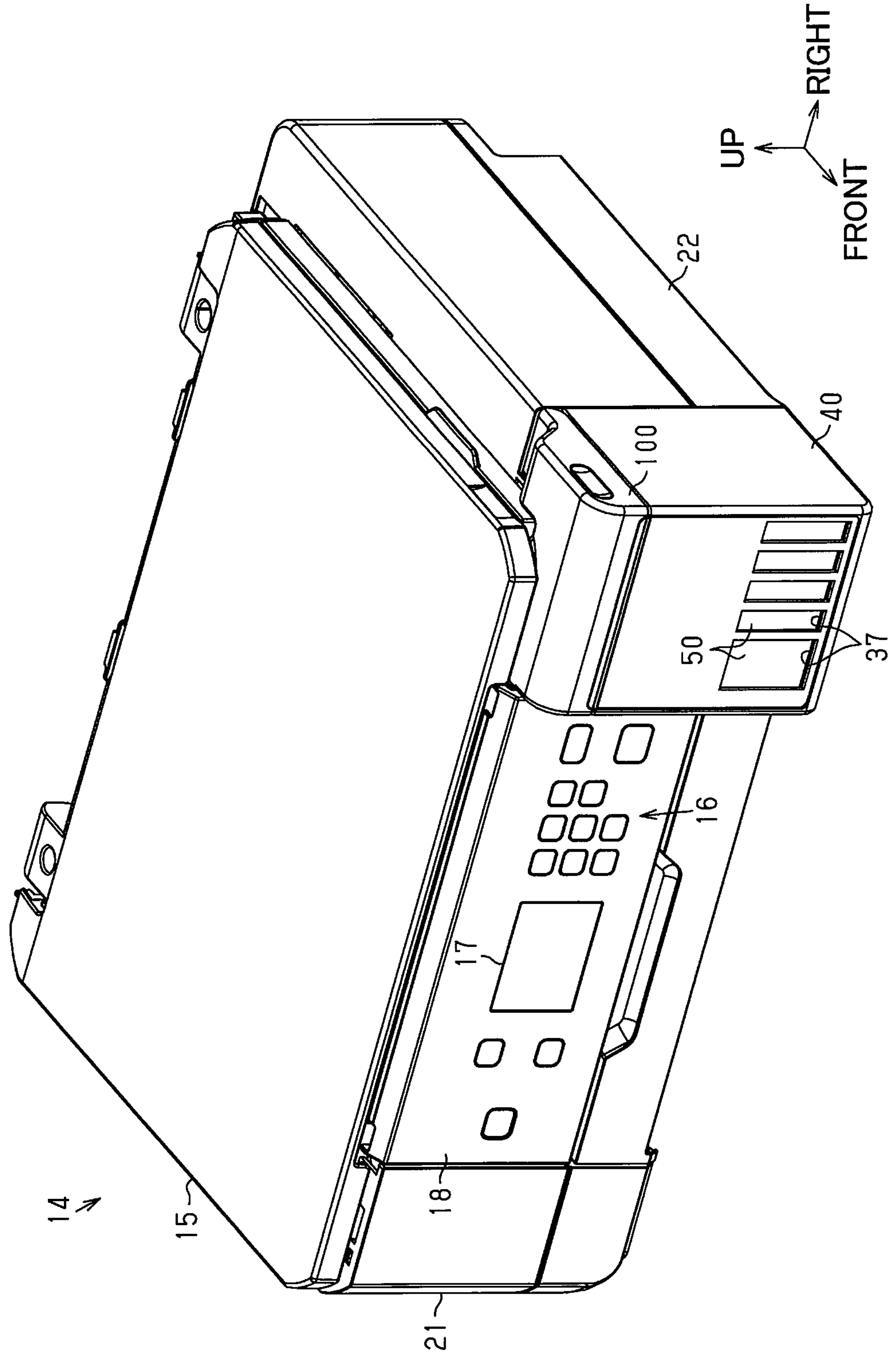
FIG. 18 is a perspective view for illustrating a multi-function printer that includes a recording device according to a second embodiment.

As illustrated in FIG. 18, a multi-function printer 14 includes the recording device 21, and an image reading device 15 located on the recording device 21 so as to cover an upper side of the recording device 21, and has a substantially rectangular parallelepiped shape overall. On a front side (front surface side) of the recording device 21, there is provided an operation panel 18 including operation buttons 16 for performing various operations of the multi-function printer 14, and a display unit 17 for displaying information on the recording device 21 and the multi-function printer 14 and the like. The ink refill unit 40 is provided on a right side of the operation panel 18.

Figure 19:
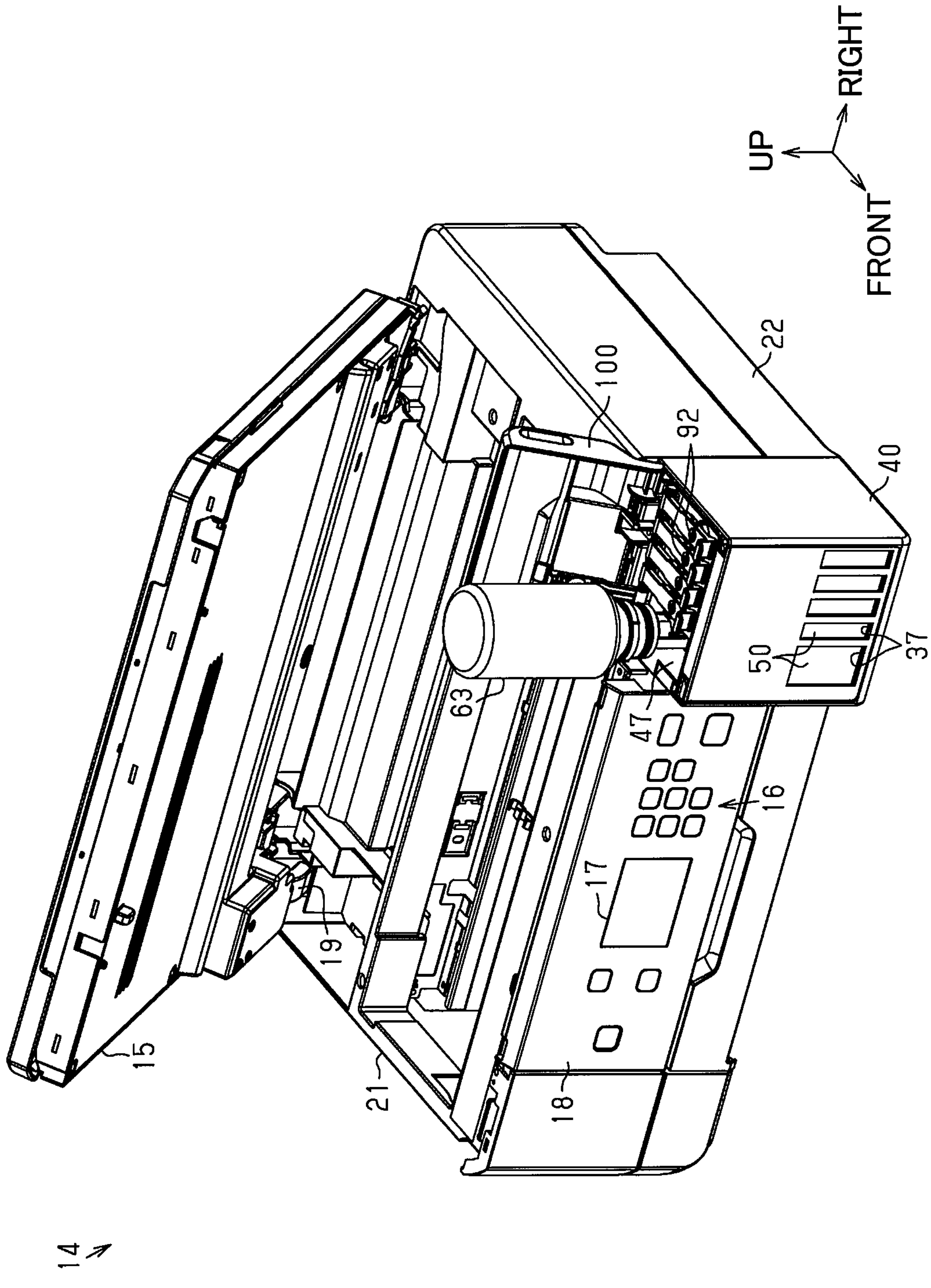
FIG. 19 is a perspective view for illustrating the multi-function printer when the ink is to be refilled to the ink tank.

As illustrated in FIG. 19, the image reading device 15 is mounted via a rotating mechanism 19 such as a hinge provided on a rear side (rear surface side) of the image reading device 15. The image reading device 15 can be opened/closed with respect to the recording device 21, and rotates between the closed position illustrated in FIG. 18 and the open position illustrated in FIG. 19. When the image reading device 15 is moved to the open position, a unit cover 100 and an elastic cap 92 of the ink refill unit 40 can be opened/closed. As illustrated in FIG. 19, when ink is refilled to the ink tanks 41 to 45 (see FIG. 20), the image reading device 15, the unit cover 100, and the elastic cap 92 are moved to the open position, and the ink refill container 63 is connected to the ink refill adapter 47 and ink tanks 41 to 45. More specifically, the ink refill adapter 47 is mounted so as to be located on the ink tanks 41 to 45 under a state in which the ink is refilled to the ink tanks 41 to 45 from the ink refill container 63. In other words, the ink refill adapter 47 connects the ink refill container 63 and the ink tanks 41 to 45 when the ink is refilled to the ink tanks 41 to 45 from the ink refill container 63.

Figure 20:
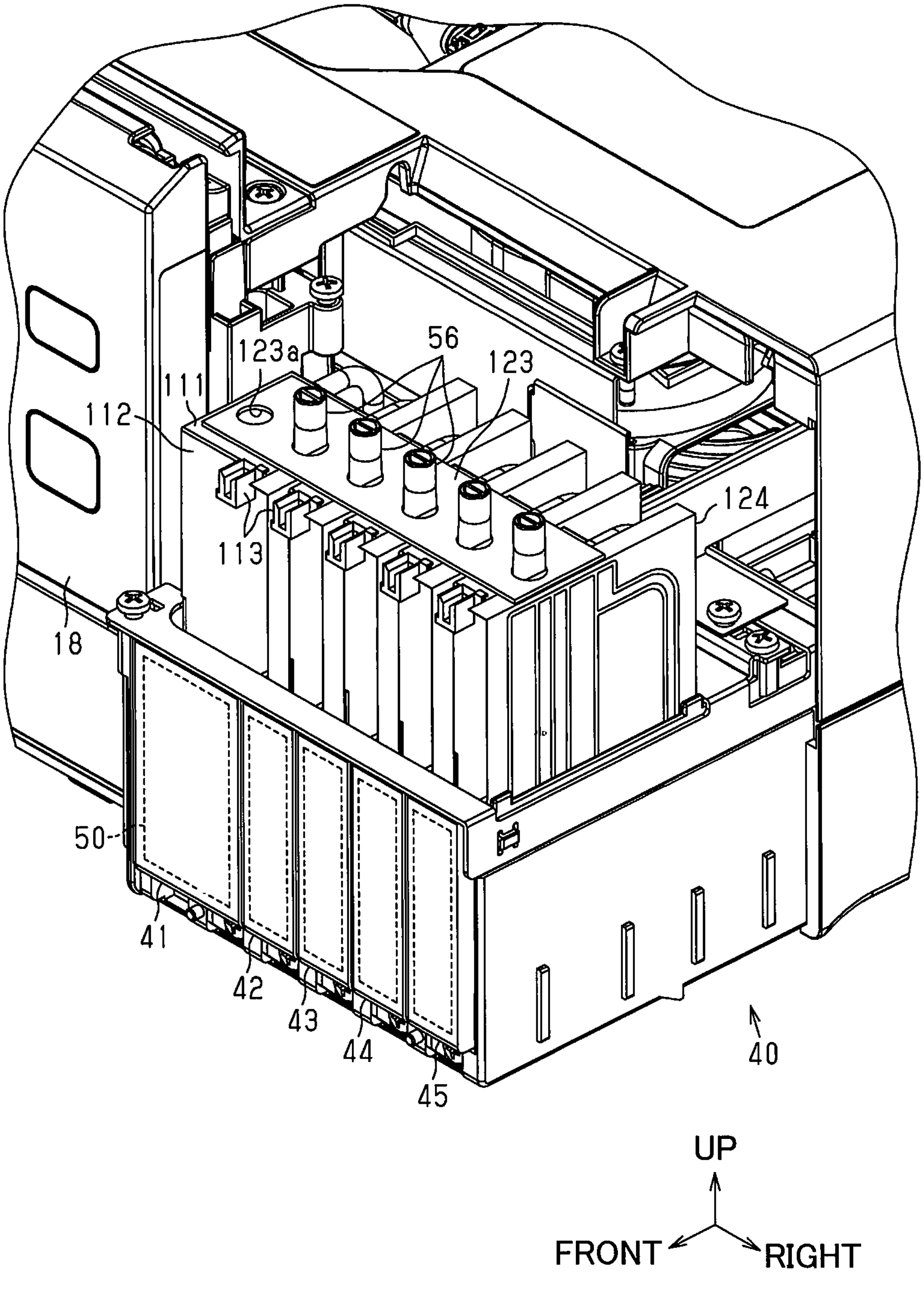
FIG. 20 is a perspective view for illustrating a state in which a casing of the ink refill unit has been removed.

As illustrated in FIG. 20, two types of ink tanks 41 to 45 having different storable ink quantities are arranged side by side with a thickness direction thereof as a left-right direction in the ink refill unit 40.

The ink tank 41, which has a large storage quantity, and the ink tanks 42 to 45, which each have a small storage quantity, have different thicknesses, but have the same structure. Therefore, common configurations in the ink tanks 41 to 45 are denoted by the same reference symbols, and redundant descriptions thereof are omitted.

The needle 56 is formed so as to protrude upward from a top surface 111 of the ink tanks 41 to 45. A side surface 112 on a visual confirmation unit 50 side (front side) that intersects with the top surface 111 is provided with a tank-side positioning portion 113 that protrudes forward. The tank-side positioning portions 113 of each of the ink tanks 41 to 45 are located at substantially the same position in the up-down direction, and intervals between tank-side positioning portions 113 between the adjacent ink tanks 41 to 45 are substantially the same.

An absorbing member 123 that has a substantially rectangular shape in plan view and that can absorb ink is provided on the top surface 111 of the ink tanks 41 to 45. A plurality of (in this embodiment, six) round holes 123*a* are formed in the absorbing member 123. In the absorbing member 123, each of the needles 56 are inserted through the round holes 123*a*, and a part of a film 124 for sealing the opening of the ink tank 41 to 45 that extends further upward than the top surface 111 is folded and attached to the ink tank 41 to 45. The absorbing member 123 may be such a size as to cover all of the top surface 111 (see FIG. 28).

Figure 21:
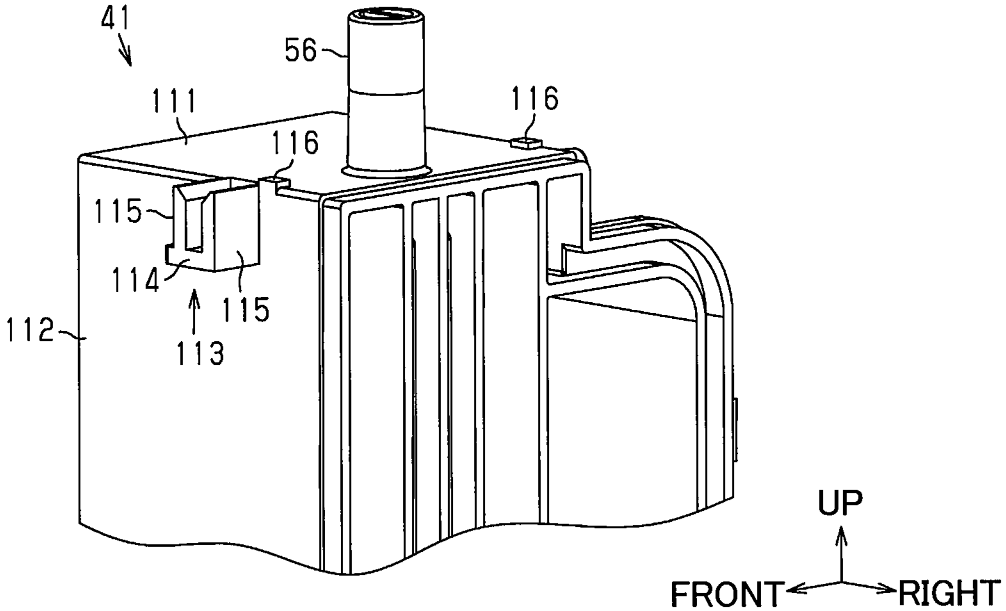
FIG. 21 is a partial perspective view for illustrating the ink tank.
Figure 22:
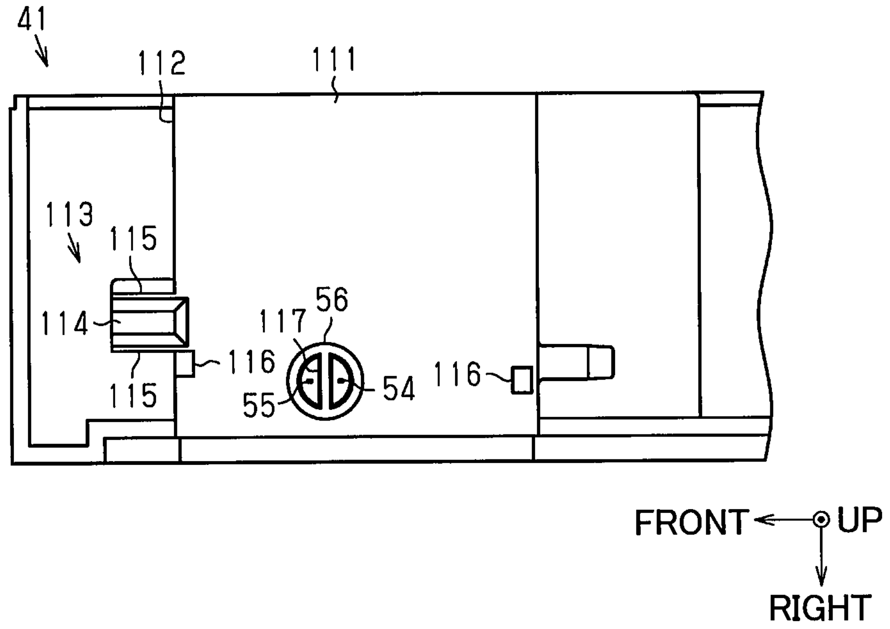
FIG. 22 is a partial plan view for illustrating the ink tank.

As illustrated in FIGS. 21 and 22, the tank-side positioning portion 113 includes a bottom wall 114 provided so as to extend from the side surface 112 at a position lower than the top surface 111, and a pair of side walls 115 that stand erect from the bottom wall 114. The tank-side positioning portion 113 is provided so as to open forward and upward.

On the top surface 111 of the ink tanks 41 to 45 at a position on a front end adjoined to the tank-side positioning portion 113, a protruded portion 116 configured to support the ink refill adapter 47 is provided. The protruded portion 116 is also provided on a rear end of the top surface 111. In other words, a pair of the protruded portions 116 is provided so as to sandwich the needle 56 at positions at either end of the top surface 111 in the front-back direction.

As illustrated in FIG. 22, a partition wall 117 that extends along the up-down direction at a center position in the front-back direction is formed in the cylindrical needle 56. The flow passages 54 and 55 are divided by this partition wall 117. Therefore, a height and cross-sectional area of tip end openings of the flow passages 54 and 55 according to this embodiment are formed substantially equal. In addition, the needle 56 is provided in the ink tanks 41 to 45 so as to allow the ink to flow into the ink storage chamber 49 provided in the ink tanks 41 to 45.

Next, the ink refill adapter 47 is described.

Figure 23:
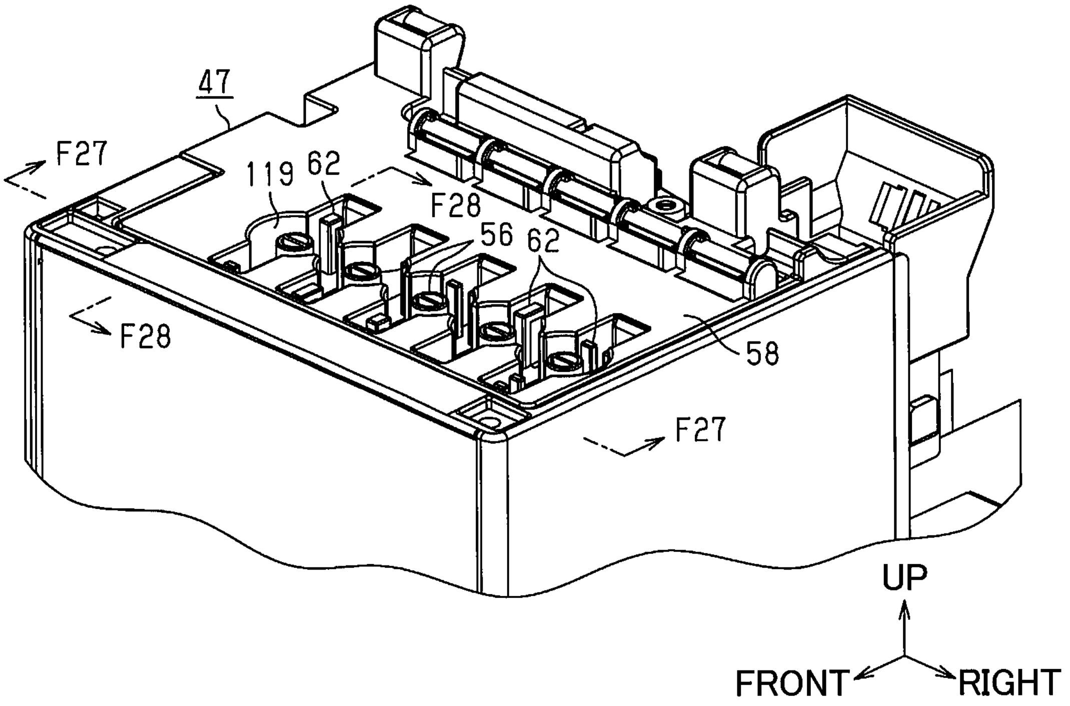
FIG. 23 is a partial perspective view for illustrating the ink refill unit.
Figure 24:
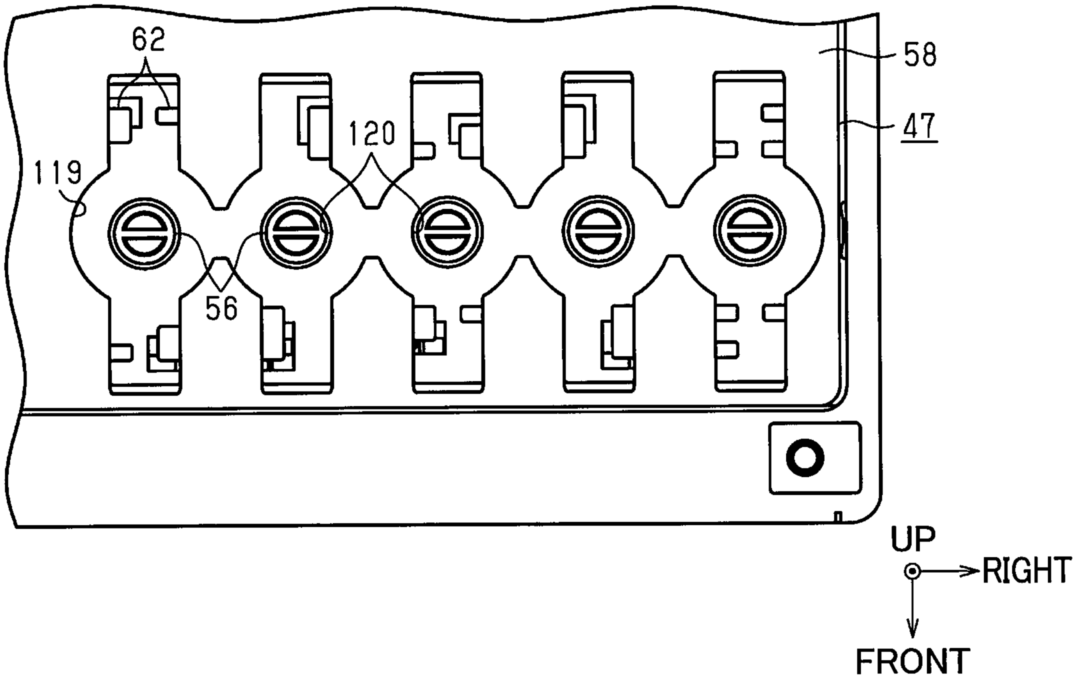
FIG. 24 is a partial plan view for illustrating the ink refill unit.

As illustrated in FIGS. 23 and 24, the ink refill adapter 47 includes an inlet forming portion 119 that partially surrounds the needle 56, which is an example of an ink inlet flow passage portion. A plurality of (in this embodiment, five, which is the same number as the ink tanks 41 to 45) inlet forming portions 119 are arranged side by side in the left-right direction on the upper surface 58 of the ink refill adapter 47. The inlet forming portion 119 according to this embodiment is a concave portion with a bottom, and has substantially the same shape as the through hole 60 (see FIG. 3) as seen in plan view. In addition, the ink refill adapter 47 includes a first concave/convex portion 62 as an example of an identification portion with which it is possible to identify the ink refill container 63 that has the ink outlet 65 that can be connected to the needle 56. The first concave/convex portion 62 according to this embodiment is provided such that a convex portion stands erect from a bottom surface of the inlet forming portion 119.

As illustrated in FIG. 24, an insertion hole 120 through which the needle 56 can be inserted is formed on the bottom surface of each of the inlet forming portions 119. The diameter of the insertion hole 120 is larger than the diameter of the needle 56, and a gap is provided between the needle 56 and the insertion hole 120. Therefore, if ink spills on the ink refill container 63 or the needle 56, the spilled ink is absorbed by the absorbing member 123 through the gap between the needle 56 and the insertion hole 120.

Figure 25:
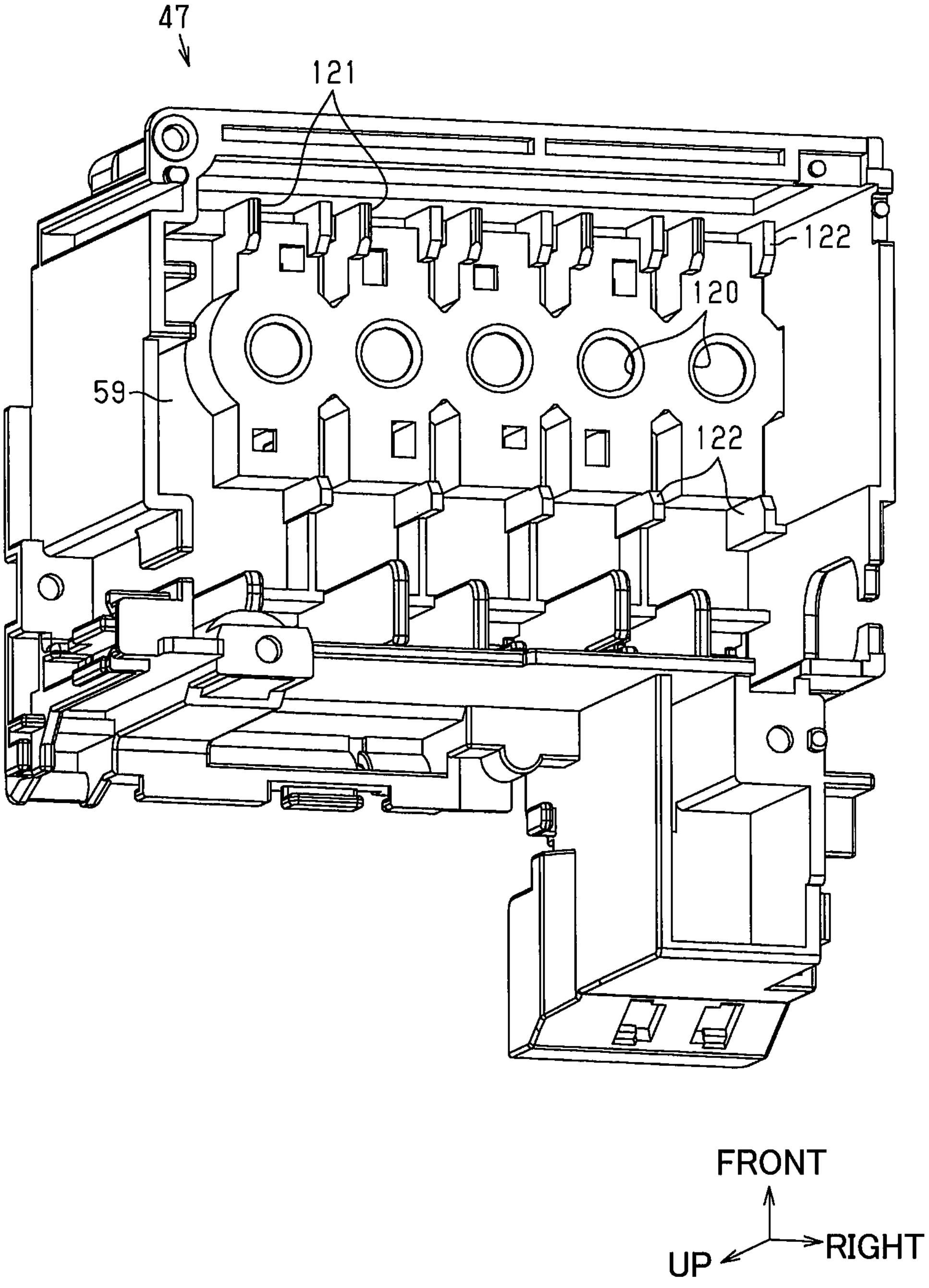
FIG. 25 is a perspective view from a lower surface side of an ink refill adapter.
Figure 26:
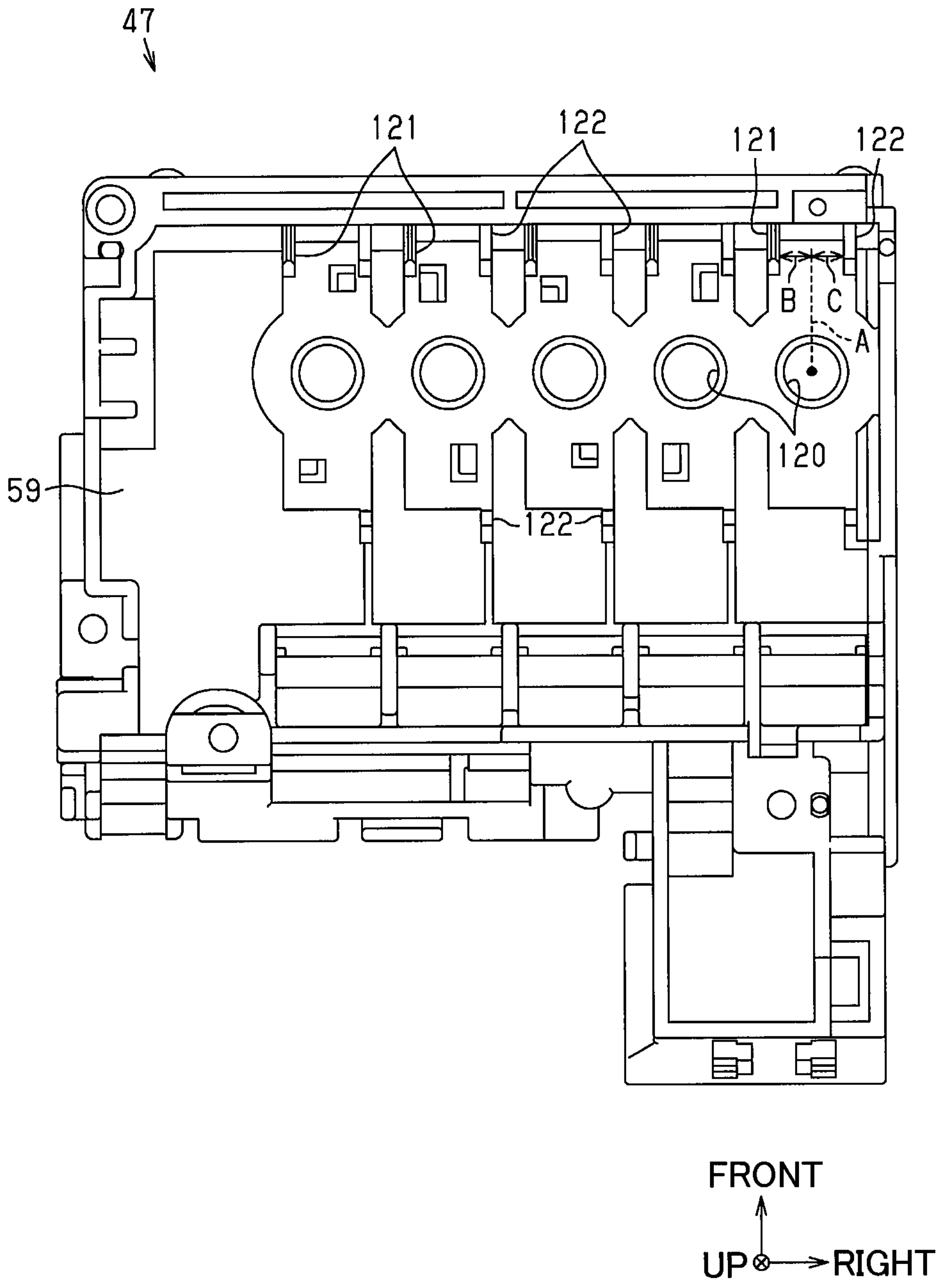
FIG. 26 is a bottom view of the ink refill adapter.

As illustrated in FIGS. 25 and 26, an adapter-side positioning portion 121 configured to position the ink refill adapter 47 with respect to the ink tanks 41 to 45 is provided on the lower surface 59 of the ink refill adapter 47. The adapter-side positioning portion 121 can be engaged with the tank-side positioning portion 113 provided in the ink tanks 41 to 45, and a plurality of (in this embodiment, five, which is the same number as the ink tanks 41 to 45) adapter-side positioning portions 121 are arranged side by side in the left-right direction at a position further forward than the insert hole 120. In addition, intervals between the plurality of adapter-side positioning portions 121 in the left-right direction is substantially equal to intervals between the tank-side positioning portion 113 in the left-right direction in the ink tanks 41 to 45.

In addition, a pair of ribs 122 provided with intervals in-between in the front-back direction are provided in a plurality of (in this embodiment, five) groups in the left-right direction on the lower surface 59 of the ink refill adapter 47. The interval between the pair of ribs 122 in the front-back direction is substantially the same as the size of the top surface 111 of the ink tanks 41 to 45. One adapter-side positioning portion 121 and one rib 122 are provided on either ends of one insertion hole 120 in the left-right direction. More specifically, as illustrated in FIG. 26, an interval B between a center line A along the front-back direction through the center of the insertion hole 120 and the adapter-side positioning portion 121 is substantially equal to an interval C between the center line A and the rib 122. Corners of the adapter-side positioning portion 121 and the rib 122 are chamfered.

As illustrated in FIGS. 24 and 25, in the ink refill adapter 47, a plurality of the inlet forming portions 119, a first concave/convex portion 62 that corresponds to the plurality of inlet forming portions 119, a plurality of the adapter-side positioning portions 121, and a plurality of groups of the ribs 122 are formed integrally.

Next, action of the ink refill adapter 47 configured as described above is described.

Figure 27:
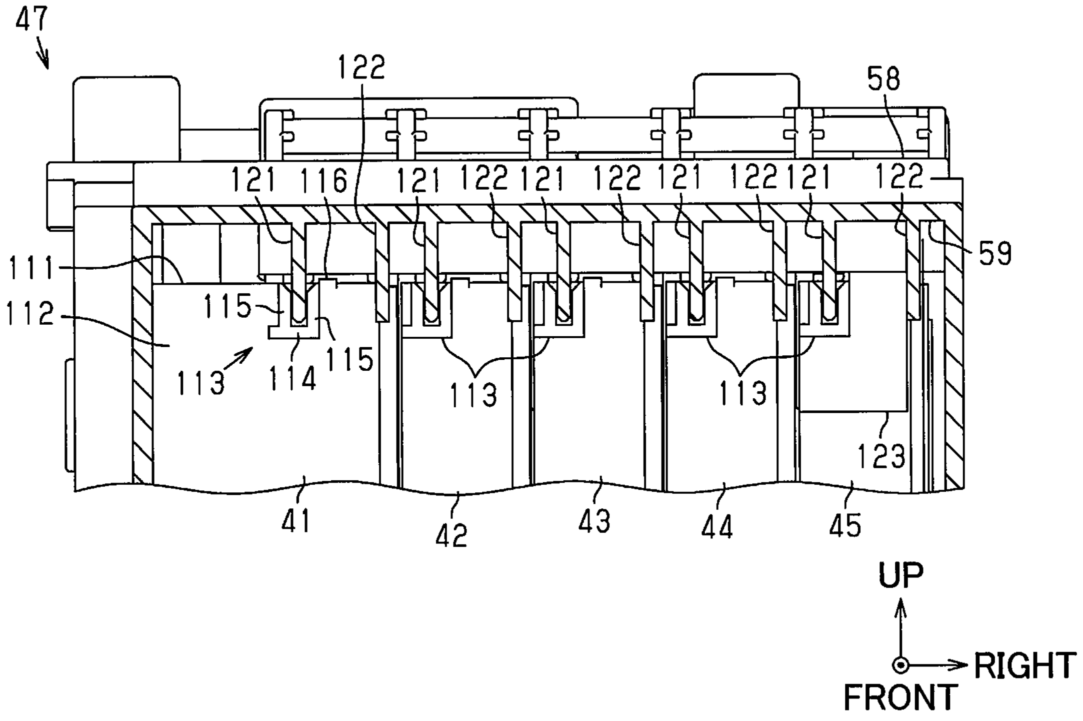
FIG. 27 is a cross-sectional view along the line F27-F27 in FIG. 23.
Figure 28:
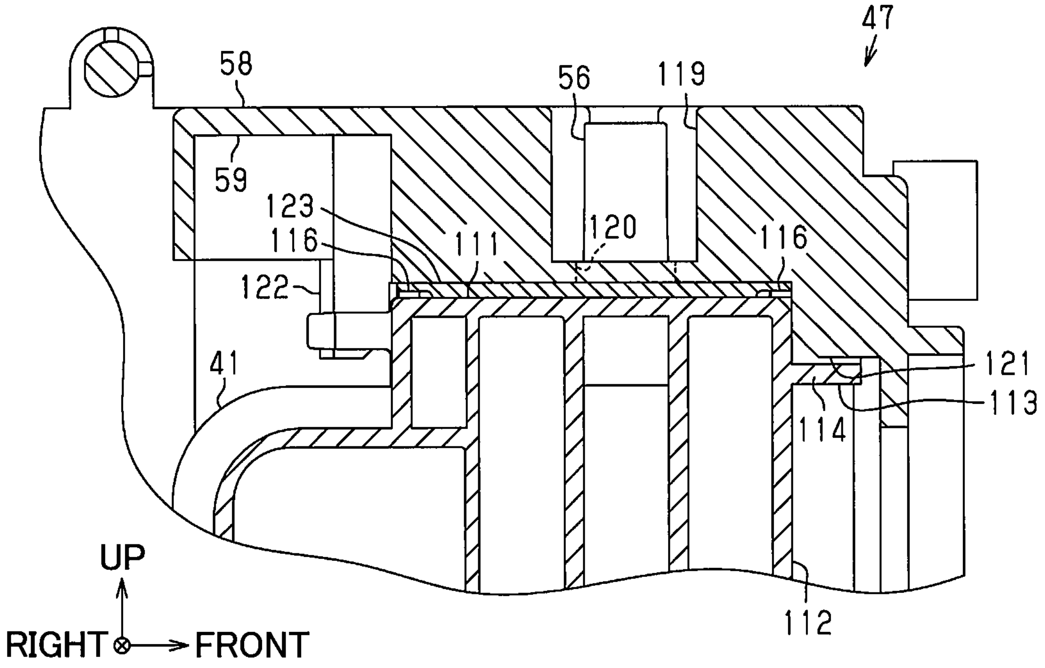
FIG. 28 is a cross-sectional view along the line F28-F28 in FIG. 23.

As illustrated in FIGS. 27 and 28, when the ink refill adapter 47 is attached to the ink tanks 41 to 45 so as to insert the needle 56 into the insertion hole 120 of the ink refill adapter 47, the adapter-side positioning portion 121 engages with the tank-side positioning portion 113. More specifically, the adapter-side positioning portion 121 is positioned in the left-right direction by being inserted between the side walls 115 of the tank-side positioning portion 113. In addition, the ink refill adapter 47 is positioned in the front-back direction by the ribs 122 sandwiching the ink tanks 41 to 45 from both sides. The ink refill adapter 47 that has been positioned with respect to the ink tanks 41 to 45 is fixed to the casing 22 with a screw (not shown).

The absorbing member 123 provided between the ink refill adapter 47 and the top surface 111 of the ink tanks 41 to 45 may be provided to each ink tank 41 to 45. In addition, the absorbing member 123 may be provided so as to extend from the top surface 111 of the ink tanks 41 to 45 to the side surface 112 (only a portion that corresponds to the ink tank 45 is illustrated in FIG. 27).

According to the above-described second embodiment, the following effects can be achieved in addition to the effects (1) to (16) of the above-described first embodiment.

(17) Because the ink refill adapter 47 is positioned with respect to the ink tanks 41 to 45, displacement between the needle 56 provided in the ink tanks 41 to 45 and the inlet forming portion 119 provided in the ink refill adapter 47 can be suppressed. Therefore, the ink can be appropriately refilled to the ink tanks 41 to 45 from the ink refill container 63 via the ink refill adapter 47.

(18) Because the inlet forming portion 119, the first concave/convex portion 62, and the adapter-side positioning portion 121 are formed integrally, the ink refill adapter 47 can be manufactured with a simpler structure than if these components were provided separately.

The above-described embodiments may be modified as follows.

Figure 29:
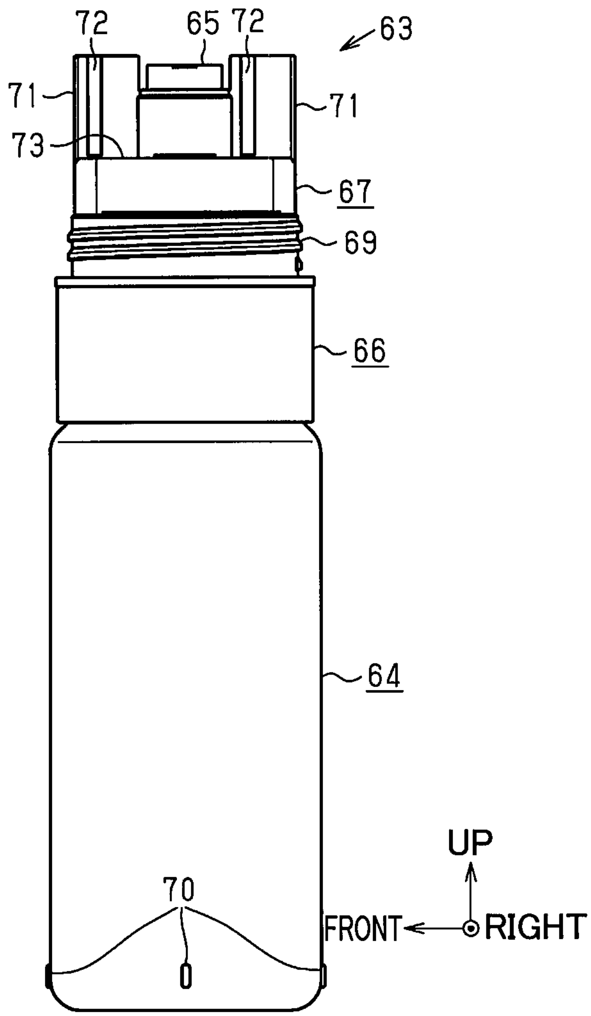
FIG. 29 is a side view for illustrating an ink refill container according to a modification example.
Figure 30:
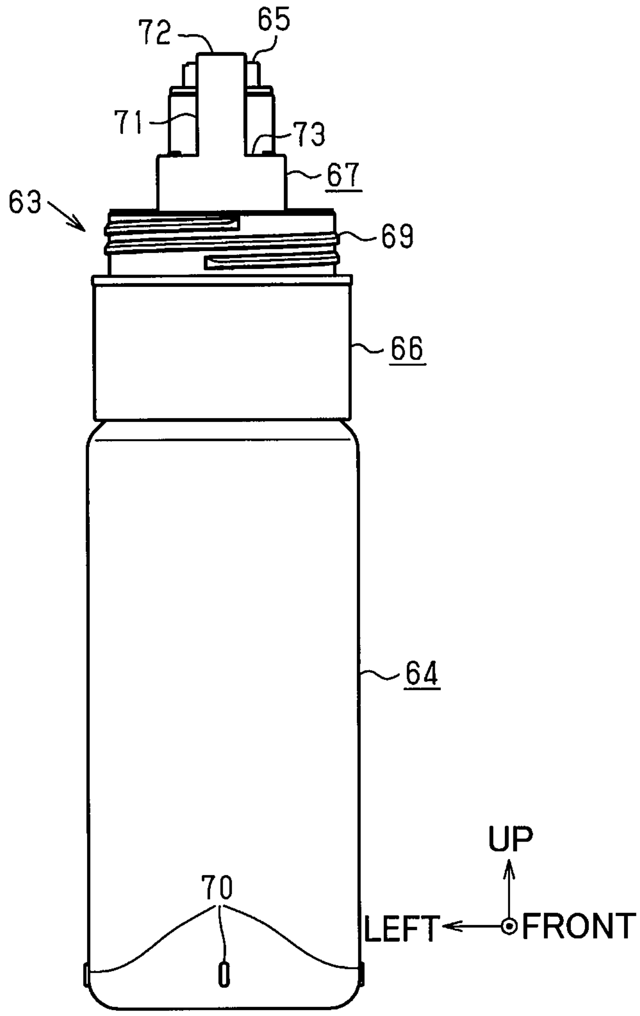
FIG. 30 is a front view for illustrating the ink refill container according to the modification example.

As illustrated in FIGS. 29 and 30, in the ink refill container 63, a tip of the convex portion 71 in the central axis direction of the ink outlet 65 may be configured to protrude more toward a side opposite to the container main body 64 than the ink outlet 65. With this configuration, when the ink is refilled, because the convex portion 71 protrudes more than the ink outlet 65 in the ink refill container 63, a risk of the ink outlet 65 touching the hand of the user or the periphery of the ink refill container 63 can be reduced, and contamination due to the ink adhering can be suppressed.

Figure 31:
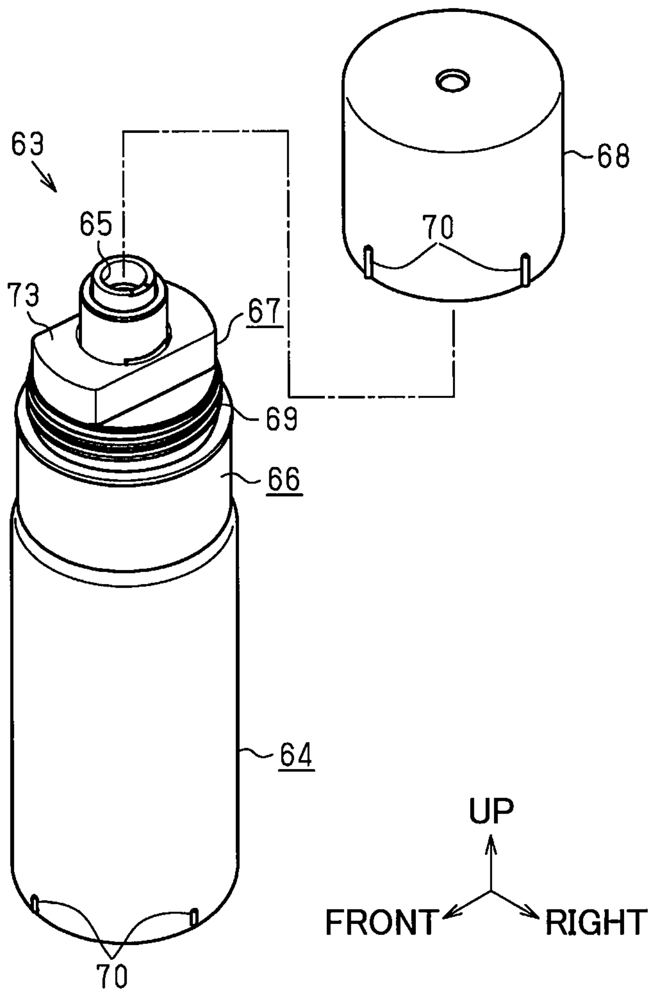
FIG. 31 is a perspective view for illustrating an ink refill container according to another modification example.

As illustrated in FIG. 31, if the ink refill container 63 includes the positioning portion 73 configured to partially abut against the ink tanks 41 to 45 when the ink is refilled to positon the valve with respect to the ink tanks 41 to 45 at a position closer to the container main body 64 than the valve 74 is to the container main body 64 in the central axis direction of the ink outlet 65, the convex portion 71 does not need to be provided. In this case, the concave portion 61 also does not need to be provided to the ink tanks 41 to 45.

Figure 32:
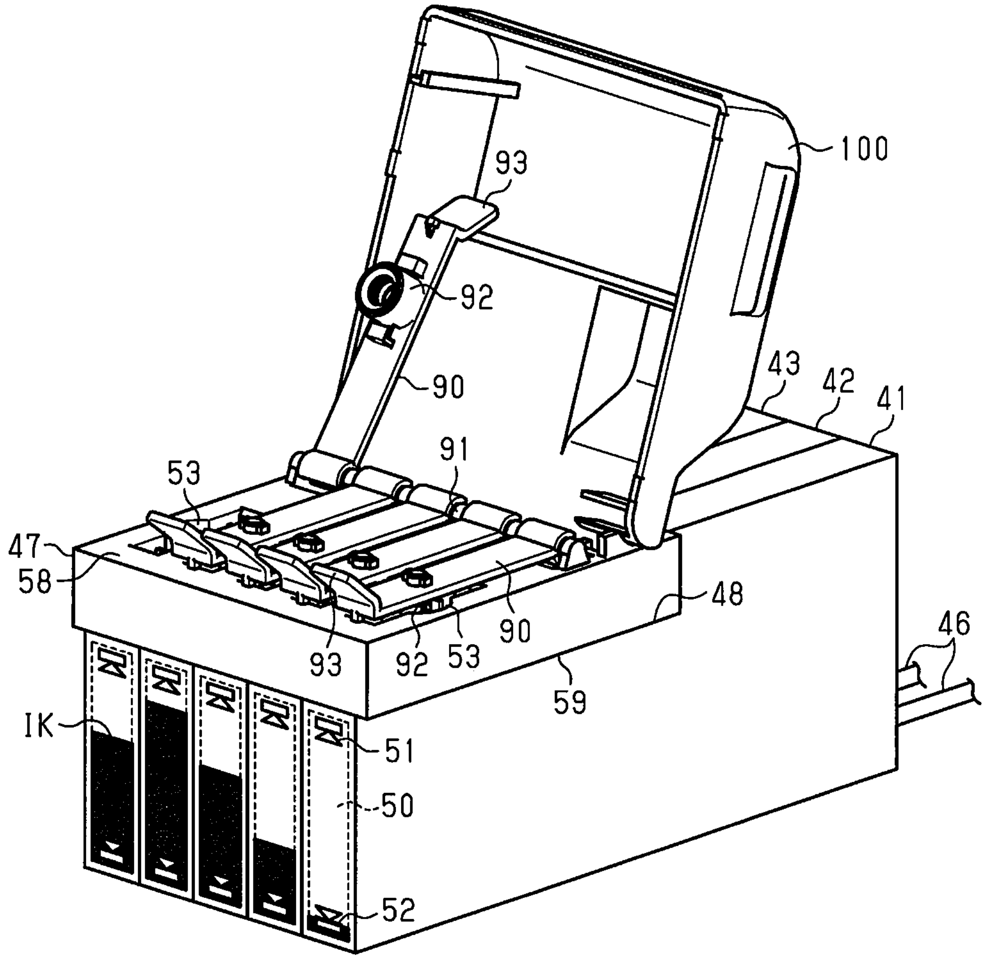
FIG. 32 is a perspective view for illustrating an ink refill unit according to a modification example.

According to a modification example illustrated in FIG. 32, the ink refill unit 40 may have a structure in which the ink inlet 53 is normally closed. More specifically, the ink refill unit 40 according to this modification example includes a lever-shaped cap supporting member 90 provided to each of the plurality of ink inlets 53. A base end portion of the cap supporting member 90 is supported so as to be rotatable about the rotation axis 91 provided so as to extend in the direction (horizontal direction) that intersects the central axis of the ink inlet 53 in the upper surface 58 of the ink refill adapter 47. A tip end side with respect to the center in a longitudinal direction of the cap supporting members 90 is provided with the elastic cap 92 having a shape that can fit into the ink inlet 53, and the cap supporting member 90 is normally in a closed state in which this elastic cap 92 is fit into the ink inlet 53. When the ink is refilled, the cap supporting member 90 in the closed state in which the elastic cap 92 is fit into the ink inlet 53 is tilted by a user who operates a handle portion 93 that has a bent tip to put the elastic cap 92 into an open state separated from the ink inlet 53. As illustrated in FIG. 32, the unit cover 100 that covers the tops of the plurality of cap supporting members 90 as a group may further be provided so as to be openable/closeable. The elastic cap 92 may be made of, for example, an elastic material such as an elastomer, and the cap supporting member 90 may be made from a material stronger than the elastic cap 92, for example, polyethylene or an ABS resin.

Figure 33:
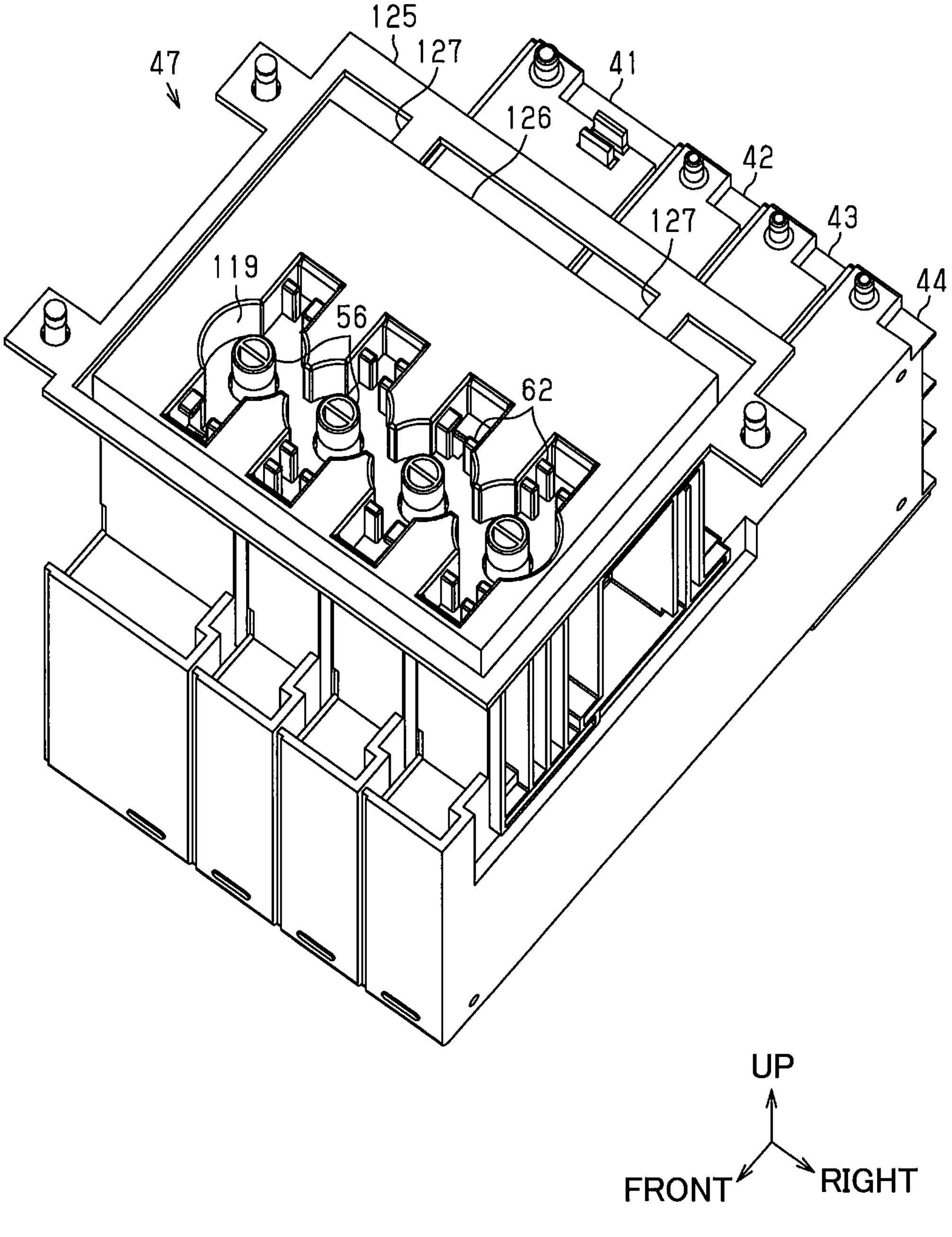
FIG. 33 is a perspective view for illustrating an ink refill adapter according to a modification example.

According to a modification example illustrated in FIG. 33, the ink refill adapter 47 may be mounted to the ink refill unit 40 so as to be movable relative to the ink tanks 41 to 44. More specifically, the ink refill adapter 47 includes a fixed portion 125 fixed to the casing 22, a displacement portion 126 that can become displaced from the ink tanks 41 to 44, and a connection portion 127 that connects the fixed portion 125 and the displacement portion 126. The connection portion 127 can deform, and the displacement portion 126 can become displaced in the direction that intersects the up-down direction in which the needle 56 extends. Therefore, the displacement portion 126 can displace under a state in which the ink refill container 63 is engaged with the inlet forming portion 119, and relatively move the ink refill container 63 and the needle 56. Therefore, because the ink outlet 65 of the ink refill container 63 and the needle 56 can be easily aligned, the risk of ink spillage can be reduced.

Figure 34:
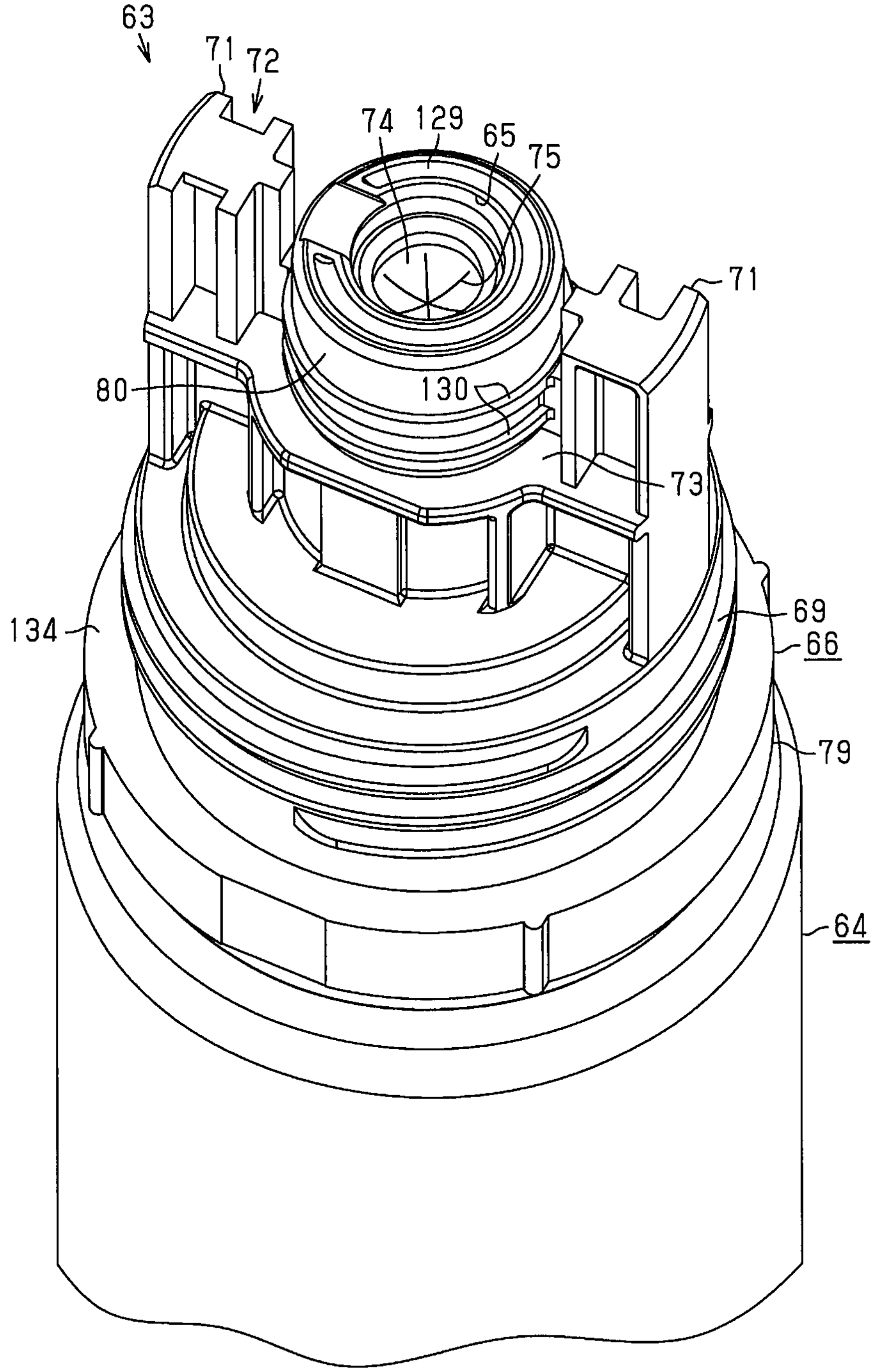
FIG. 34 is a partial perspective view for illustrating an ink refill container according to a modification example.

According to a modification example illustrated in FIG. 34, a groove portion 129 may be formed on the tip of the ink outlet 65. In addition, at least one (in this embodiment, two) cyclic convex portion 130 may be formed between the tip of the ink outlet 65 and the positioning portion 73 so as to extend along the outer periphery of the small-diameter portion 80. By providing the groove portion 129, when the ink refill container 63 that has refilled the ink to the ink tanks 41 to 45 is made erect, the risk of ink leaking from the ink outlet 65 can be reduced. In addition, by providing the cyclic convex portions 130, the ink can be held back even if the ink leaks from the ink outlet 65.

Figure 35:
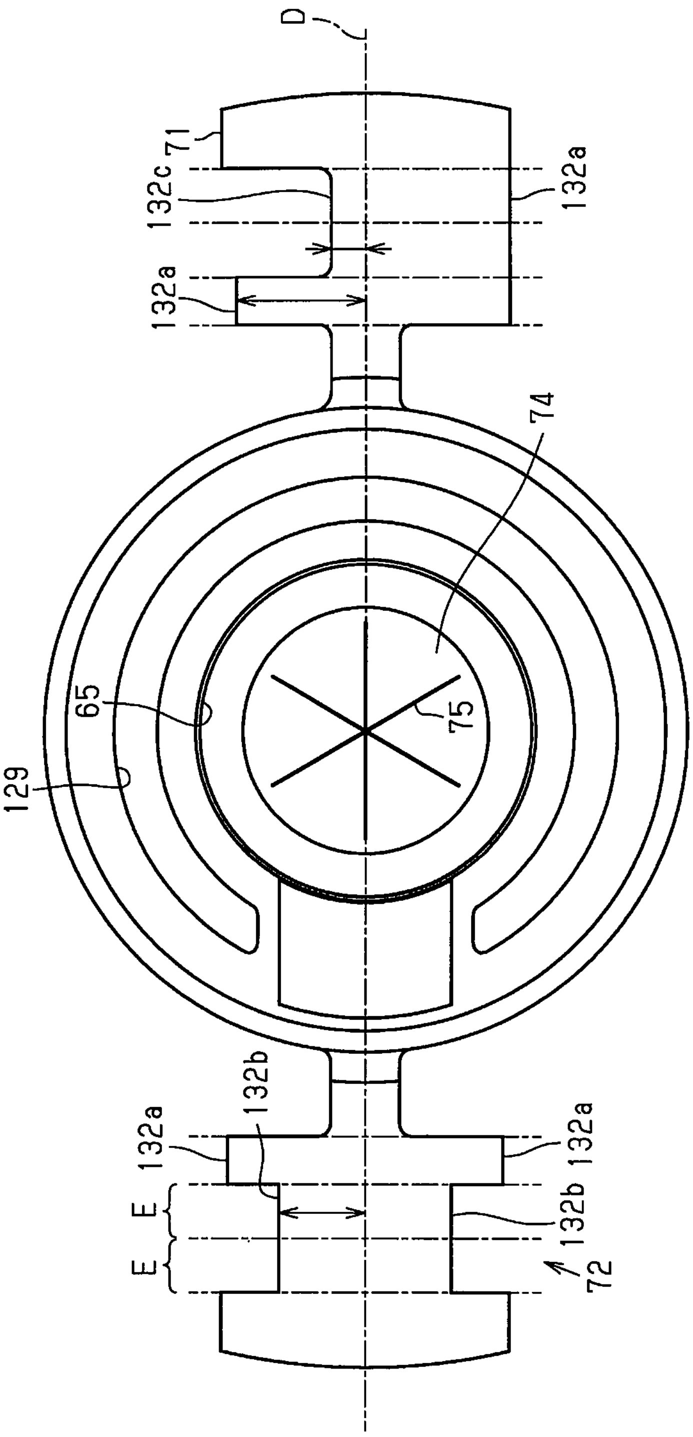
FIG. 35 is a plan view for illustrating an ink outlet and a second concave/convex portion according to a modification example.

According to a modification example illustrated in FIG. 35, the pair of convex portions 71 provided along a straight line D that passes through the center of the ink outlet 65 may be divided into a plurality of (in this embodiment, six) regions E, and the second concave/convex portion 72 may be formed of identification convex portions 132*a* to 132*c* provided in each of the regions E. In this modification example, the second concave/convex portion 72 is formed of three types of identification convex portions 132*a* to 132*c*. More specifically, a first identification convex portion 132*a* having a long length from the straight line D to the side surface of the convex portion 71, a second identification convex portion 132*b* that is shorter than the first identification convex portion 132*a*, and a third identification convex portion 132*c* shorter than the second identification convex portion 132*b* may be combined as needed to form the second concave/convex portion 72. The number of regions E and the number of types of identification convex portions 132*a* to 132*c* can be increased to increase patterns on the second concave/convex portion 72 and correspond to the amount and type of ink.

Figure 36:
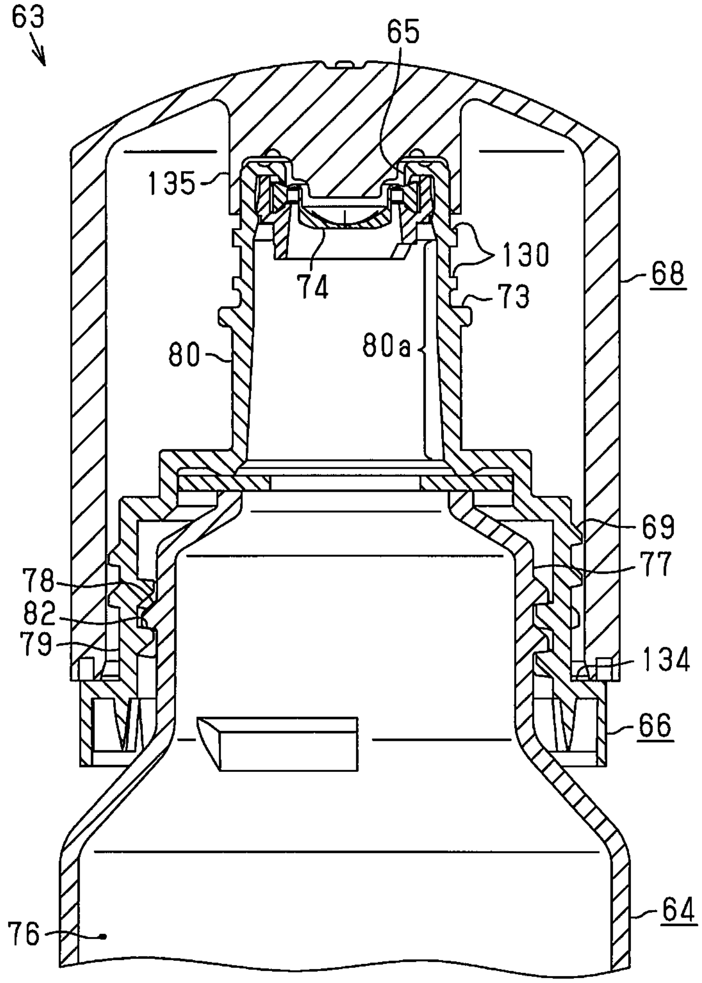
FIG. 36 is a partial cross-sectional view for illustrating the ink refill container and a cap according to a modification example.

According to a modification example illustrated in FIG. 36, the small-diameter portion 80 may be made of a transparent or translucent material. In addition, a surface on an inner side of the small-diameter portion 80 extending toward the ink storage chamber 76 from the valve 74 may be a rough surface 80*a* provided with uneveness through, for example, grinding. The rough surface 80*a* can make it easier to identify the color of ink from outside the small-diameter portion 80 because the rough surface 80*a* has high wettability and ink easily remains on the rough surface 80*a*.

Figure 37:
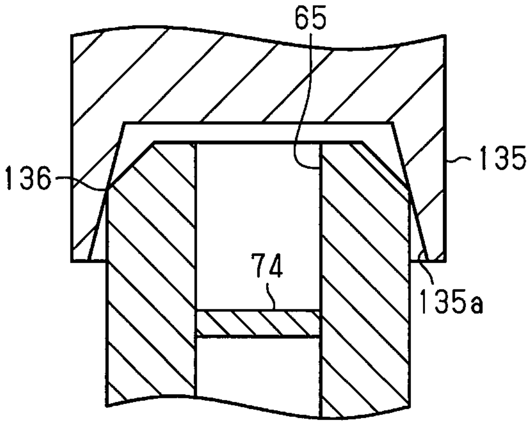
FIG. 37 is a schematic cross-sectional view for illustrating an ink outlet and a sealing portion according to a modification example.

According to a modification example illustrated in FIGS. 36 and 37, the cap 68 is attached to the ink refill container 63 so as to make contact with an attachment surface 134 of the ink refill container 63, and is in a state of being attached. In addition, in the state of being attached, the cap 68 includes an annular sealing portion 135 configured to seal the ink outlet 65. An inner surface 135*a* of the sealing portion 135 is obliquely formed so as to widen toward the tip. In the state of being attached, the cap 68 seals the ink outlet 65 by the inner surface 135*a* making contact with a corner 136 of the ink outlet 65. Therefore, even when the cap 68 is lightly engaged with and attached to the attachment surface 134, the contact between the inner surface 135*a* and the corner 136 can reduce the risk of the ink spilling from the ink outlet 65. The corner 136 may be a portion at which two surfaces facing in different directions intersect, or may be curved.

Among the first concave/convex portion 62, the adapter-side positioning portion 121, and the rib 122 in the ink refill adapter 47, at least one component may be formed separately. Among the ribs 122 provided in on both the front and rear sides, the rib 122 on the front side may not be provided. At least one rib 122 may be provided on the rear side, and the ink refill adapter 47 may be positioned in the front-back direction by the rib 122 on the rear side and the adapter-side positioning portion 121. In addition, the rib 122 may not be provided.

If the tank-side positioning portion 113 and the adapter-side positioning portion 121 can be engaged with each other to position the ink refill adapter 47 to the ink tanks 41 to 45, the shapes of those components may be changed as needed. For example, the tank-side positioning portion 113 may be a step portion formed around the needle 56, and the adapter-side positioning portion 121 may be a concave portion that surrounds the step portion, or a hole. By providing the tank-side positioning portion 113 and the adapter-side positioning portion 121 at a position close to the needle 56, positional accuracy of the inlet forming portion 119 with respect to the needle 56 can be increased.

The ink refill container 63 may protrude further outward than the outer peripheral surface of the container main body 64 provided with the ink storage chamber 76 in the radial direction in which the convex portions 71 are centered about the ink outlet 65. With this configuration, the user can easily visually recognize the convex portions 71 when viewing the ink refill container 63, and the convex portion 71 of the ink refill container 63 can be more easily fitted into the concave portion 61 of the ink tanks 41 to 45 when the ink is refilled. As a result, incorrect connection of the ink refill container 63 to the ink tanks 41 to 45 can be reduced.

The first portion provided to each of the ink tanks 41 to 45 as a portion that indicates information associated with the ink stored in the ink tanks 41 to 45, and the second portion provided to each of the ink refill containers 63 as a portion that indicates information associated with the ink stored in the ink refill containers 63 may be information other than color information, such as text information or shape information. In addition, the first portion and the second portion may not be provided.

If the plurality of concave portions 61 is provided on the ink tank 41 to 45 side, the convex portions 71 on the ink refill container 63 side may have a single configuration. In addition, if there is a plurality of concave portions 61, the plurality of concave portions 61 do not necessarily have to be arranged point symmetrical about the center of the ink inlet 53.

If the plurality of concave portions 61 on the ink tank 41 to 45 side are provided at a point symmetrical position, in addition to the pair of concave portions 61 symmetrical at 180°, a plurality of point symmetric arrangement configurations may be used, such as three at 120° point symmetry, and four at 90° point symmetry.

Among the ink concave portions 61 and the convex portions 71 that are engaged when the ink is refilled, a convex portion 71 may be provided to the ink tank 41 to 45 side as a first fitting portion, and a concave portion 61 may be provided to the ink refill container 63 side as a second fitting portion.

If the depth direction of the concave portion 61 on the ink tank 41 to 45 sides follows the direction in which the needle 56 located at the center of the ink inlet 53 extends, the depth direction does not necessarily need to be a vertical direction, and may be a direction that intersects a perpendicular direction. However, in order to suppress ink leakage, a direction along a horizontal direction is not preferable as the depth direction of the concave portion 61.

The height of the tip of the first concave/convex portion 62 on the inner surface of the concave portion 61 may be equal to or more than a height of the opening edge of the concave portion 61.

If the identification portion with which it is possible to identify the ink refill container 63 having the ink outlet 65 that can connect to the ink inlet 53 of the ink tank 41 to 45 is provided separately, the first concave/convex portion 62 on the inner surface of the concave portion 61 and the second concave/convex portion 72 on the outer surface of the convex portion 71 need not necessarily be provided.

The two flow passages 54 and 55 that include the needle 56 of the ink inlet 53 may have both tip openings that are the same height, or a plurality of flow passages other than two may be provided.

In the ink refill container 63, the convex portion 71 and the positioning portion 73 may be directly formed in the ink outlet-forming portion 66 instead of in the container appendage 67 that is added to the ink outlet-forming portion 66. More specifically, the container appendage 67 may not be added to the ink outlet-forming portion 66, and may be formed integrally with the ink outlet-forming portion 66.

If the positioning portion 73 in the ink refill container 63 is in the region that forms an outer edge of ink outlet 65 in the radial direction centered about the ink outlet 65, the positioning portion 73 may be provided outside the radial direction and not outside the plurality of radial directions centered on the ink outlet 65.

The valve of the ink outlet 65 of the ink refill container 63 may be provided with a different number of slits 75, for example, two slits or four slits, as long as the number of slits 75 is more than one. In addition, the valve is not limited to the slit valve provided with the slits 75, and may be a valve that is not provided with the slits 75 and that displaces in a valve-open direction when pushed from below by the needle 56.

The positioning portion 73 in the ink refill container 63 is not limited to a flat shape, and may have a shape including one or more protrusions or ribs if the positioning portion 73 is to abut against the upper surface (receiving surface) 58 of the ink refill adapter 47 when the ink is refilled.

REFERENCE SIGNS LIST

40 . . . ink refill unit, 41 to 45 . . . ink tank, 46 . . . ink refill tube, 47 . . . ink refill adapter, 48 . . . step portion, 49 . . . ink storage chamber, 50 . . . visual recognition portion, 53 . . . ink inlet, 54, 55 . . . flow passage, 56 . . . needle (ink inlet flow passage portion), 57 . . . remaining ink sensor, 58 . . . upper surface (receiving surface), 59 . . . lower surface (tank engaging portion), 60 . . . through hole, 61 . . . concave portion (first fitting portion), 62 . . . first concave/convex portion (identification unit), 63 . . . ink refill container, 64 . . . container main body, 65 . . . ink outlet, 66 . . . ink outlet-forming portion, 67 . . . container appendage, 69 . . . male threaded portion, 70 . . . protrusion, 71 . . . convex portion (second fitting portion), 72 . . . second concave/convex portion, 73 . . . positioning portion, 74 . . . valve, 75 . . . slit, 76 . . . ink storage chamber, 91 . . . joining portion, 92 . . . tubular portion, 93 . . . outflow passage, 94 . . . end surface, 102 . . . holder, 103 . . . flange portion, 113 . . . tank-side positioning portion, 119 . . . inlet forming portion, 121 . . . adapter-side positioning portion, IK . . . ink.

The invention claimed is:

1. An ink refill container configured to refill ink to an ink tank provided with a needle having a flow passage, the ink refill container comprising:

a container main body comprising an ink storage chamber configured to store ink to be refilled to the ink tank;

an ink outlet-forming portion, the ink outlet-forming portion having an ink outlet that allows the ink to flow out from the ink storage chamber;

a valve disposed in the ink outlet, the valve being configured to be opened by the needle inserted into the ink outlet and closed by removal of the needle from the ink outlet;

a cap; and an attachment surface located lower than the ink outlet in a state that the ink outlet is directed upward, wherein the cap is configured to be in contact with the attachment surface in a capping state that the cap covers the ink outlet.

2. The ink refill container according to claim 1, further comprising a thread forming portion, wherein the cap is engaged with the thread forming portion in the capping state.

3. The ink refill container according to claim 2, wherein the attachment surface protrudes further outwards in a radial direction than the thread forming portion.

4. The ink refill container according to claim 2, wherein the attachment surface is located lower than the thread forming portion in the state that the ink outlet is directed upward.

5. The ink refill container according to claim 2, wherein further comprising a pair of portions opposed to each other across the ink outlet, each portion extending radially outward and having a radially outward end extending vertically to the thread forming portion.

6. The ink refill container according to claim 5, wherein the radially outward end of each of the portions has an arc shape in a plan view as seen from the ink outlet side.

7. The ink refill container according to claim 5, wherein the cap covers the pair of the portions in the capping state.

8. The ink refill container according to claim 1, wherein the ink outlet-forming portion includes a small-diameter portion having the ink outlet.

9. The ink refill container according to claim 8, wherein the small-diameter portion has at least one cyclic convex portion extending along a periphery of the small-diameter portion.

10. The ink refill container according to claim 9, wherein the cyclic convex portion is covered with the cap and radially spaced from the cap in the capping state.

11. The ink refill container according to claim 1, wherein the cap includes a plurality of protrusions on outer peripheral surface thereof at equal intervals, the protrusions extending from a lower portion of the cap toward a top of the cap.

12. An ink refill container configured to refill ink to a printer, the printer formed with an ink storage chamber of an ink tank; a hole having a circular portion and a pair of rectangular portions continuous to and arranged on opposite sides of the circular portion; a needle in fluid communication with the ink storage chamber of the ink tank, arranged in the circular portion, and extending in a vertical direction; and a receiving surface surrounding the hole and extending in a horizontal direction intersecting the vertical direction, the ink refill container comprising:

a container main body; and an ink outlet-forming portion connected to the container main body and having an ink outlet, when the ink outlet is directed upward, and viewed from the ink outlet side in the vertical direction, the ink outlet-forming portion comprising:

a valve disposed in the ink outlet-forming portion and configured to be opened by the needle inserted in the ink outlet and closed by taking the ink refill container away from the needle;

a pair of horizontal surfaces provided at a position lower than a position of the ink outlet and arranged on opposite sides of the ink outlet in a first horizontal direction, each of the pair of the horizontal surfaces having end portions spaced apart with respect to each other in a second horizontal direction orthogonal to the first horizontal direction, the end portions extending in the first horizontal direction; and a pair of convex portions extending upward from the pair of the horizontal surfaces, each of the pair of the convex portions disposed between the end portions in the second horizontal direction, wherein the ink outlet is configured to be inserted to the circular portion of the hole and connected to the needle, and at least a part of the pair of convex portions are configured to be inserted to the pair of rectangular portions of the hole in a state that the ink refill container is attached to the printer.

13. The ink refill container according to claim 12, wherein at least a part of the pair of the horizontal surfaces is configured to abut against at least a part of the receiving surface.

14. The ink refill container according to claim 12, wherein the valve has one or more slits in an elastic member sealing the ink outlet, and is opened in a state that the one or more slits are pushed inward from outside the ink outlet.

15. The ink refill container according to claim 12, wherein the pair of the horizontal surfaces have first end surfaces in the first horizontal direction, the pair of the convex portions have second end surfaces in the first horizontal direction, and the first end surfaces are flush with the second end surfaces.

16. The ink refill container according to claim 12, further comprising a cap configured to cover the ink outlet and the pair of the convex portions.

* * * * *